(12) United States Patent
Fukuda

(10) Patent No.: US 9,941,573 B2
(45) Date of Patent: *Apr. 10, 2018

(54) ARTICLE MANAGEMENT SYSTEM

(71) Applicant: NEC Corporation, Tokyo (JP)

(72) Inventor: Hiroshi Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/122,805

(22) PCT Filed: Jan. 20, 2015

(86) PCT No.: PCT/JP2015/000223
§ 371 (c)(1),
(2) Date: Aug. 31, 2016

(87) PCT Pub. No.: WO2015/133051
PCT Pub. Date: Sep. 11, 2015

(65) Prior Publication Data
US 2017/0077588 A1  Mar. 16, 2017

(30) Foreign Application Priority Data

Mar. 7, 2014  (JP) ................. 2014-044835

(51) Int. Cl.
*H01Q 1/22* (2006.01)
*H01Q 13/20* (2006.01)
(Continued)

(52) U.S. Cl.
CPC ........... *H01Q 1/2216* (2013.01); *G06Q 10/08* (2013.01); *H01Q 13/20* (2013.01); *H01Q 13/206* (2013.01); *H01Q 21/068* (2013.01)

(58) Field of Classification Search
CPC .... H01Q 1/2216; H01Q 21/068; H01Q 13/20; H01Q 13/206; G06Q 10/08
See application file for complete search history.

(56) References Cited

U.S. PATENT DOCUMENTS 7,154,283 B1 * 12/2006 Weakley ................ G01R 29/08
324/756.01
7,232,068 B2 * 6/2007 Uchiyama ............. G01S 13/758
235/380
(Continued)

FOREIGN PATENT DOCUMENTS

CA          2601110 A1      10/2006
CA          2847423 A1       3/2013
(Continued)

OTHER PUBLICATIONS

International Search Report corresponding to PCT/JP2015/000223 dated Apr. 14, 2015 (2 pages).

*Primary Examiner* — Erin M File
(74) *Attorney, Agent, or Firm* — Wilmer Cutler Pickering Hale and Dorr LLP

(57) ABSTRACT

A problem with conventional article management systems has been that the management scheme for articles. The present invention addresses this problem by providing an article management system comprising: a transmitting antenna for transmitting a radio signal; a receiving antenna for receiving a radio signal; a article to be managed positioning region whereat articles to be managed are placed; an RF tag provided with a tag transmitting unit which electromagnetically couples with the transmitting antenna and the receiving antenna; and an RFID reader which sends a transmission signal to the RF tag via the transmitting antenna and receives a response signal outputted by the tag transmitting unit via the receiving antenna. The RFID reader detects whether or not a article to be managed is present by detecting for changes in the operation characteristics of the tag transmitting unit due to the article to be managed according to changes in either the strength or phase of the response signal from the RF tag.

10 Claims, 12 Drawing Sheets

(51) Int. Cl.
*H01Q 21/06* (2006.01)
*G06Q 10/08* (2012.01)

(56) References Cited

U.S. PATENT DOCUMENTS

| | | | |
|---|---|---|---|
| 7,271,724 | B2 | 9/2007 | Goyal et al. |
| 8,120,495 | B2* | 2/2012 | Fukuda ............... H01Q 1/2216 340/10.1 |
| 8,289,163 | B2* | 10/2012 | Erickson ............. G06K 7/0008 340/572.1 |
| 8,400,273 | B2* | 3/2013 | dos Reis Medeiros ............ G06K 7/0008 340/10.1 |
| 9,721,130 | B2* | 8/2017 | Hattori ............... G06K 7/10415 |
| 2006/0214792 | A1 | 9/2006 | Goyal et al. |
| 2011/0090130 | A1 | 4/2011 | Choi et al. |
| 2011/0156906 | A1* | 6/2011 | Chou ................ G06K 7/10237 340/572.1 |
| 2011/0288938 | A1* | 11/2011 | Cook ................ G06Q 30/0251 705/14.66 |
| 2013/0048724 | A1 | 2/2013 | Burnside et al. |
| 2013/0080279 | A1* | 3/2013 | Daily .................... A47F 9/047 705/23 |
| 2015/0235066 | A1* | 8/2015 | Hattori ............... G06K 7/10415 340/10.1 |
| 2015/0294323 | A1* | 10/2015 | Hattori ............... G06Q 10/0833 705/7.29 |
| 2015/0304611 | A1* | 10/2015 | Nakase .............. G06K 7/10415 348/143 |

FOREIGN PATENT DOCUMENTS

| | | |
|---|---|---|
| JP | H09-205306 A | 8/1997 |
| JP | 2004-246816 A | 9/2004 |
| JP | 2006-197202 A | 7/2006 |
| JP | 2009-165061 A | 7/2009 |
| JP | 2009-239404 A | 10/2009 |
| JP | 2010-098361 A | 4/2010 |
| JP | 2010-225127 A | 10/2010 |
| JP | 2010-541388 A | 12/2010 |
| JP | 2011-087296 A | 4/2011 |
| JP | 2011-114633 A | 6/2011 |
| JP | 2012-117905 A | 6/2012 |
| JP | 2012-213216 A | 11/2012 |
| JP | 2012-235204 A | 11/2012 |
| WO | WO-2006/104587 A2 | 10/2006 |
| WO | WO-2013/032697 A2 | 3/2013 |
| WO | WO-2014/041715 A1 | 3/2014 |

* cited by examiner

Fig. 5

| DISTANCE r | $1/4 \cdot (\lambda/2\pi)$ ≒0.04λ | $1/2 \cdot (\lambda/2\pi)$ ≒0.08λ | $\lambda/2\pi$ ≒0.16λ | $2 \cdot (\lambda/2\pi)$ ≒0.32λ | λ | 2λ |
|---|---|---|---|---|---|---|
| IN CASE OF 950 MHz | 1.3cm | 2.5cm | 5.0cm | 10.1cm | 31.6cm | 63.2cm |
| QUASI-ELECTRO-STATIC FIELD ($1/r^3$) | 64 | 8 | 1 | 1/8≒0.13 | ≒0.004 | ≒5×10$^{-4}$ |
| INDUCTION ELECTRIC FIELD ($1/r^2$) | 16 | 4 | 1 | 1/4≒0.25 | ≒0.025 | ≒6×10$^{-3}$ |
| RADIATION ELECTRIC FIELD ($1/r$) | 4 | 2 | 1 | 1/2≒0.5 | ≒0.16 | ≒0.08 |

ARTICLE MANAGEMENT SYSTEM

CROSS-REFERENCE TO RELATED APPLICATIONS

This application is a national stage application of International Application No. PCT/JP2015/000223 entitled "Article Management System" filed on Jan. 20, 2015, which claims priority to Japanese Application No. 2014-044835 filed on Mar. 7, 2014, the disclosures of which are hereby incorporated by reference in their entirety.

TECHNICAL FIELD

The present invention relates to an article management system.

BACKGROUND ART

A radio frequency identification (RFID) system, becoming widespread in recent years, is used in article management such as inventory management, by affixing an RF tag to a article to be managed.

Examples of such an RFID system are disclosed in PTLs 1 to 4. Technologies described in PTLs 1 to 4 manage a article to be managed by affixing an RF tag to the article to be managed, and, when tag information in the RF tag can be read, determining that the article to be managed is present, and, when the tag information cannot be read, determining that the article to be managed is not present. However, there are following problems in such a use of the RFID system.

First, there is a problem of improper reading of tag information in an RF tag. For example, when the system is used for commodity management on a display shelf at a retail store, a third person other than a consumer having intention to purchase a commodity or a clerk involved in commodity management may read tag information in an RF tag affixed to the commodity. In such a case, there is a problem, for example, that information about the commodity being purchased or has been purchased by the consumer may be associated with the consumer, resulting in invasion of privacy. Further, when a raw material stored in a warehouse or a product to be shipped is similarly managed by the RFID system, there is also an information security problem that a third person may become aware of warehousing/delivery status of the raw material or the product, being attached with an RF tag, by reading tag information in the RF tag.

Secondly, there is a problem that a cost of an RF tag is high. Although a cost of a tag in an ultra-high frequency (UHF) band is currently reduced to lower than ten yen per piece, the cost is about two orders of magnitude higher than a cost of a bar code similarly used in article management, particularly in commodity management. Consequently, it is difficult from a viewpoint of cost to attach an RF tag to an article at roughly 1000 yen or lower.

A technology for dealing with such problems is disclosed in PTL 5. Similarly to the aforementioned RFID system, a technology of performing article management is disclosed in PTL 5. More precisely, PTL 5 is related to a smart shelf using an RFID system, and is related to a technology of monitoring presence or absence of an article on a shelf.

In PTL 5, an RF tag is positioned on a shelf. Then, an article being a managed object (hereinafter referred to as article to be managed) is positioned so that the article blocks read operation of an RFID reader on a plurality of RF tags positioned on the shelf. In other words, in PTL 5, a article to be managed is positioned between an RF tag and an antenna attaching to the RFID reader. Then, in PTL 5, a quantity of articles is monitored through a following procedure.

(a) The RFID reader irradiates an electromagnetic wave on the shelf.
(b) The number of RF tags from which the RFID reader is not able to read tag information due to presence of an article, is measured.
(c) A quantity of articles is measured, in accordance with the information obtained in (b).

An RF tag is adjusted so that an article hinders the reader from reading the tag when the article is positioned between the reader and the tag.

In the technology described in aforementioned PTL 5, when an article to be managed is positioned between the RFID reader and an RF tag, that is, when an article to be managed is present on the shelf, the RFID reader is not able to read tag information in the RF tag, due to the article blocking a line of sight between the RF tag and the RFID reader. In other words, when an article to be managed is present, tag information in the RF tag corresponding to the article cannot be read, and therefore presence of the article to be managed can be detected. By contrast, when an article to be managed is not present on the shelf, that is, when an article to be managed is not present between the RFID reader and an RF tag, an article to be managed blocking a line of sight between the RF tag and the RFID reader is not present, and therefore the RFID reader is able to read tag information in the RF tag. Accordingly, when an article to be managed is not present, tag information corresponding to the article can be read, and therefore absence of the article can be detected. Consequently, in PTL 5, presence or absence of an article can be detected, and article management on the shelf can be performed. It is assumed that a manageable article is an article containing metal, water, or the like, hindering transfer of energy at a radio frequency.

In the technology in aforementioned PTL 5, an RF tag is not affixed to an article to be managed and remains on the shelf, and therefore a problem of invasion of privacy and information security, due to improper reading of tag information in an RF tag affixed to an article to be managed, does not occur. Accordingly, in the technology in PTL 5, the first problem, being a problem of a third person improperly reading tag information in an RF tag, does not occur. Further, in the technology in PTL 5, an RF tag is not affixed to an article and remains on a shelf, and therefore the RF tag can be repeatedly used and a tag cost per article substantially becomes a value of the cost divided by a tag use count. In other words, in the technology in PTL 5, the second problem, being a problem of a high RF tag cost, is solved by sufficiently repeated use.

Further, PTLs 6 to 9 disclose technologies of performing contactless signal transfer by electromagnetic coupling. The technologies enable signal transfer even when both ends of a coupler are physically separated, by one end of the coupler being electromagnetically coupled with the other end, either capacitively or inductively.

Further, PTLs 10 to 12 disclose technologies of stabilizing radio communication when reading an RFID tag. In PTL 10, attenuation of magnetic field current within a resonance circuit is reduced, by passing a magnetic field generated by electromagnetic coupling, through a circular magnetic material layer, thus stabilizing radio communication. PTLs 11 and 12 disclose suppression of mutual interference between neighboring RFID tags, by positioning an interference suppression means.

CITATION LIST

Patent Literature

[PTL 1]
Japanese Unexamined Patent Application Publication No. 2011-114633
[PTL 2]
Japanese Unexamined Patent Application Publication No. 2012-117905
[PTL 3]
Japanese Unexamined Patent Application Publication No. 2006-197202
[PTL 4]
Japanese Unexamined Patent Application Publication No. 2012-213216
[PTL 5]
U.S. Pat. No. 7,271,724
[PTL 6]
Japanese Translation of PCT International Application Publication No. 2010-541388
[PTL 7]
Japanese Unexamined Patent Application Publication No. 2010-225127
[PTL 8]
Japanese Unexamined Patent Application Publication No. 2009-239404
[PTL 9]
Japanese Unexamined Patent Application Publication No. H09-205306
[PTL 10]
Japanese Unexamined Patent Application Publication No. 2010-98361
[PTL 11]
Japanese Unexamined Patent Application Publication No. 2009-165061
[PTL 12]
Japanese Unexamined Patent Application Publication No. 2004-246816

SUMMARY OF INVENTION

Technical Problem

In the technology described in aforementioned PTL 5, a article to be managed is positioned between an RFID reader and an RF tag. In other words, in the technology described in PTL 5, there is a limitation based on article positioning that a position of a article to be managed is limited between an RFID reader and an RF tag. Further, in the technology described in PTL 5, in order to secure a large coverage area by an RFID reader to manage a plurality of articles, the RFID reader shall be positioned separately from a shelf on which an RF tag is positioned. In other words, a reader antenna provided as part of the RFID reader is also separated from the shelf. The reason is that a reader antenna attaching to a commonly used RFID reader is designed to operate as a wave source of a uniform radio wave in a far field. Accordingly, it is assumed in introduction of a system using the technology described in PTL 5 that a large space is required for radio wave propagation accompanying communication between the RFID reader and an RF tag.

Specifically, in the technology described in PTL 5, a distance between a shelf, a article to be managed, and an RF tag, and a reader antenna attached to an RFID reader is sufficiently long, and a radio wave is irradiated from the reader antenna being sufficiently smaller than the shelf.

In such a case, depending on shelf material, particularly in case of a shelf of metallic material, a multipath phenomenon occurs, resulting in a problem that tag reading becomes unstable, or tag information in an RF tag cannot be read, due to radio wave interference. Further, when a person or a thing comes between a reader antenna and a location where an article to be managed is positioned, tag information in the RF tag cannot be read similarly to a case that an article to be managed is present, resulting in a problem that an article to be managed is erroneously detected, even when there is no article to be managed.

Furthermore, in a case that a transmission signal is transmitted from an antenna to an RFID tag, even when an end of the antenna is terminated, a reflected wave is generated at the end. In this case, when a response signal from the RFID tag is received by the antenna transmitting the transmission signal, an S/N of the response signal is degraded due to influence of the reflected wave. Consequently, receiving sensitivity to the response signal degrades. The problem cannot be solved by the technologies disclosed in aforementioned PTLs 10 to 12.

An object the present invention is to provide an article management system solving such problems.

Solution to Problem

An article management system according to an aspect of the present invention includes: a transmitting antenna composed of an open-type transmission line with matched termination, and transmitting a radio signal; a receiving antenna composed of an open-type transmission line, and receiving a radio signal; an article to be managed positioning region in which an article to be managed is placed; an RF tag provided with tag transmission unit for electromagnetically coupling with the transmitting antenna and the receiving antenna in the article to be managed positioning region; and an RFID reader transmitting a transmission signal to the RF tag through the transmitting antenna, and receiving a response signal output by the tag transmission unit through the receiving antenna, wherein the RFID reader detects presence or absence of the article to be managed, by detecting change in an operation characteristic of the tag transmission unit due to the article to be managed, through change in strength or phase of a response signal from the RF tag.

Advantageous Effect of Invention

The present invention is able to provide an article management system capable of preventing erroneous detection related to presence or absence of an article to be managed, while improving security related to the article to be managed.

BRIEF DESCRIPTION OF DRAWINGS

FIG. 5 is a table illustrating dependence on a distance r normalized by a wavelength $\lambda$, with respect to relative strengths of a quasi-electrostatic field, an induction electric field, and a radiation electric field, in an electric field $E_\theta$.

DESCRIPTION OF EMBODIMENTS

With reference to the drawings, exemplary embodiments of the present invention will be described below. A same reference sign is given to a same component in the respective drawings, thus omitting overlapping description thereof as appropriate.

First Exemplary Embodiment

Figure 1:
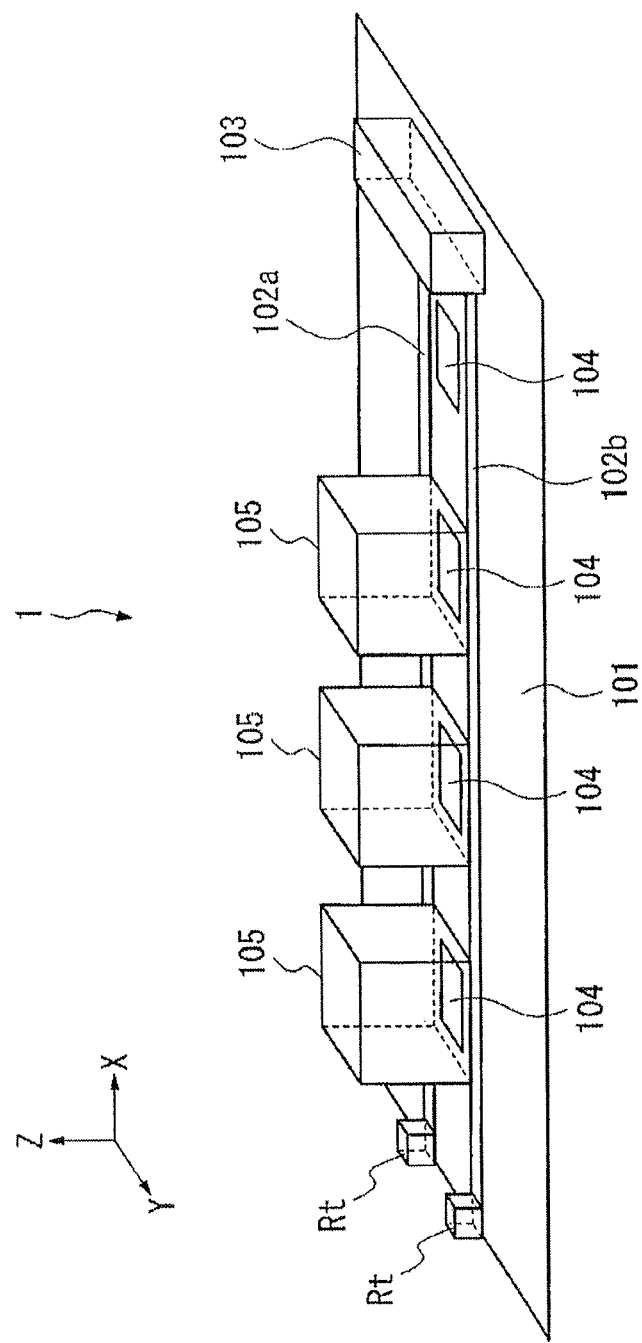
FIG. 1 is a schematic diagram of an article management system according to a first exemplary embodiment.

First, FIG. 1 illustrates a schematic diagram of an article management system 1 according to a first exemplary embodiment. As illustrated in FIG. 1, the article management system 1 according to the first exemplary embodiment includes a transmitting antenna 102a, a receiving antenna 102b, an RFID reader 103, an RF tag 104, and an article to be managed 105. The transmitting antenna 102a and the receiving antenna 102b are composed of a dielectric layer 101, a strip conductor 102, a grounding conductor 102g, and a matched-termination resistor Rt.

The dielectric layer 101 is, for example, a plate-shaped member formed by a dielectric substance. In the following description, a surface of the dielectric layer 101 on which an article to be managed is placed is referred to as a front surface. The transmitting antenna 102a is composed of an open-type transmission line with matched termination, and transmits a radio signal to the RF tag 104. The receiving antenna 102b is composed of an open-type transmission line, and receives a response signal from the RF tag 104. The transmitting antenna 102a and the receiving antenna 102b are traveling-wave near-field antennas for reader use, using a microstrip line being an open-type transmission line. Further, the transmitting antenna 102a and the receiving antenna 102b may use a transmission line such as a coplanar line, a grounded coplanar line, a slot line, and a balanced-two-wire transmission line, mainly generating an electromagnetic field distribution composed of a quasi-static electromagnetic field and an induction electromagnetic field around the transmission line, as an open-type transmission line. A coaxial cable, a waveguide, and the like, being transmission lines around which shielding is provided, are shield-type transmission lines not generating such an electromagnetic field around the transmission line, and therefore cannot be used as the transmitting antenna 102a nor the receiving antenna 102b without some special means to leak an electromagnetic field.

The RFID reader 103 transmits a transmission signal to the transmitting antenna 102a, and receives a response signal generated by a tag antenna in the RF tag 104, through the receiving antenna 102b.

More specifically, one end of each of the transmitting antenna 102a and the receiving antenna 102b is connected to the RFID reader 103. Then, the RFID reader 103 transmits a generated transmission signal to the transmitting antenna 102a, and transfers the transmission signal to the tag antenna in the RF tag 104 electromagnetically coupled with the transmitting antenna 102a. On the other hand, the RFID reader 103 receives a response signal generated in the RF tag 104, being transferred by radio communication to the receiving antenna 102b electromagnetically coupled with the RF tag 104. A matched-termination resistor Rt is connected to the other end of the strip conductor in the transmitting antenna 102a. A matched-termination resistor Rt is connected to the other end of the receiving antenna 102b.

The RF tag 104 is installed at a location at which the tag electromagnetically couples with the transmitting antenna 102a and the receiving antenna 102b, with an article to be managed placed close by. While an example of using a passive tag as the RF tag 104 according to the present exemplary embodiment is described, an active tag may also be used as the RF tag 104. When receiving a signal inquiring about an ID (hereinafter referred to as tag information) from the transmitting antenna 102a, a passive tag generates electric power for operating an own chip by use of a power circuit (not illustrated) in the chip, with part of a signal obtained through a tag antenna. Further, the passive tag decodes part of the received signal to generate received data. Then, the passive tag refers to tag information stored in a storage circuit in the chip, operates a modulation circuit (not illustrated) to generate a modulation signal, and transmits the modulation signal to the receiving antenna 102b through the tag antenna.

An article to be managed 105 is positioned at a location at which the article electromagnetically couples with the tag antenna in the RF tag 104. The location at which the article to be managed 105 is placed is hereinafter referred to as a management-target article positioning region 110. It is desirable that the article to be managed 105 contains a material with a high dielectric constant such as water, or metal, but not limited thereto. More specifically, a bundle of thick paper such as a book, a rice ball, bread, a prepared food packaged in plastic, a human body such as a hand and a foot, a shoe, and the like may be considered as an article to be managed, in addition to a drink in a plastic bottle, a canned drink, a snack packaged in aluminum.

Such accommodation of various articles such as a watery article results from use of an RFID system in a UHF band or a microwave band. An RFID system used in a frequency band at 13.56 MHz or below first exhibits very weak reaction to water, due to a thicker skin depth. Further, electromagnetic induction is used in coupling between a reader and a tag in these frequency bands. Electromagnetic induction is coupling by a magnetic field, and therefore is sensitive to difference in relative permeability, while not sensitive to difference in relative dielectric constant. Accordingly, even when a relative dielectric constant of water has a very high value of 80, operation of a tag antenna does not sensitively react to water in the case of electromagnetic induction. Further, in general, most substances other than a magnetic material take a relative permeability value of around 1. By contrast, a relative dielectric constant often takes a value greatly different from 1. Furthermore, in contrast to an RFID system depending solely on electromagnetic induction, the present invention uses electromagnetic field components of a quasi-static electromagnetic field, an induction electromagnetic field, and a radiation electromagnetic field, and therefore a degree of freedom in relative positioning of, the transmitting antenna and the receiving antenna, and the tag, is high. For example, a magnetic flux generated by the transmitting antenna and the receiving antenna does not need to be aligned to penetrate a coiled antenna in the tag, as with an RFID system using electromagnetic induction, or a condition for the alignment is relaxed. Further, with a higher frequency band used, a data rate is higher than an RFID system using electromagnetic induction. Therefore, it is desirable to use an RFID system in a UHF band or a microwave band. The RF tag 104 may be covered with a plastic plate or the like. Thus, durability of the tag can be increased. A small amount of water such as condensation may stick to a surface of the RF tag, in which case influence of the small amount of water may be eliminated, by adjusting a coupling coefficient and the like between the tag antenna and the article to be managed.

An operation of the article management system 1 according to the first exemplary embodiment will be described. The article management system 1 detects presence or absence of a article to be managed, in accordance with a response signal generated in an RF tag 104. When performing the detection operation, the article management system 1 first transmits a tag information read command as a transmission signal from the RFID reader 103 through the transmitting antenna 102a.

Next, the RF tag 104 receives the transmission signal. Then, the RF tag 104 generates electric power by use of part of the received signal and starts operation. Subsequently, the RF tag 104 decodes the received signal and regenerates received data included in the received signal. The RF tag 104 refers to the received data and tag information included in an internal storage circuit, and, when determining to respond, in accordance with the tag information and the received data, transmits a modulation signal generated on the basis of a tag signal, to the receiving antenna 102b, as a response signal.

At this time, the RFID reader 103 determines presence or absence of a article to be managed, in accordance with change in strength or phase of a response signal from the RF tag 104 corresponding to the transmitted tag information read command. As a more specific example, when signal strength of a response signal from the RF tag 104 is high, the RFID reader 103 determines that an article to be managed is not present, and, when signal strength of a response signal from the RF tag 104 is low, determines that an article to be managed is present. For example, in the example illustrated in FIG. 1, there is no article to be managed on an RF tag 104 positioned on the rightmost side of the diagram, and therefore the RF tag 104 is able to transmit a response signal with a higher signal strength, compared with a case that an article to be managed is present, and the RFID reader 103 determines that an article to be managed 105 is not present at this RF tag 104 location by the signal strength. By contrast, articles to be managed 105 are placed on the other three RF tags 104 in FIG. 1, and therefore a signal strength of a response signal transmitted by each of the three other RF tags 104 is lower, compared with a case that there is no article to be managed. Consequently, the RFID reader 103 determines that articles to be managed 105 are present at the other three RF tag 104 locations. An example of a case that signal strength of a response signal is low includes a case that a signal strength falls short of receiving sensitivity of the RFID reader 103 and the response signal cannot be detected. Further, it is assumed that the RFID reader 103 is connected to a computer, or functions as part of a computer, and determination of presence or absence of a article to be managed 105 is performed by the computer.

The reason for the change in signal strength of a response signal as described above is that the article to be managed 105 electromagnetically couples with a tag antenna in the RF tag 104. Positional relations between an article to be managed 105, an RF tag 104, and the transmitting antenna 102a and the receiving antenna 102b will be further described in detail below.

Figure 2:
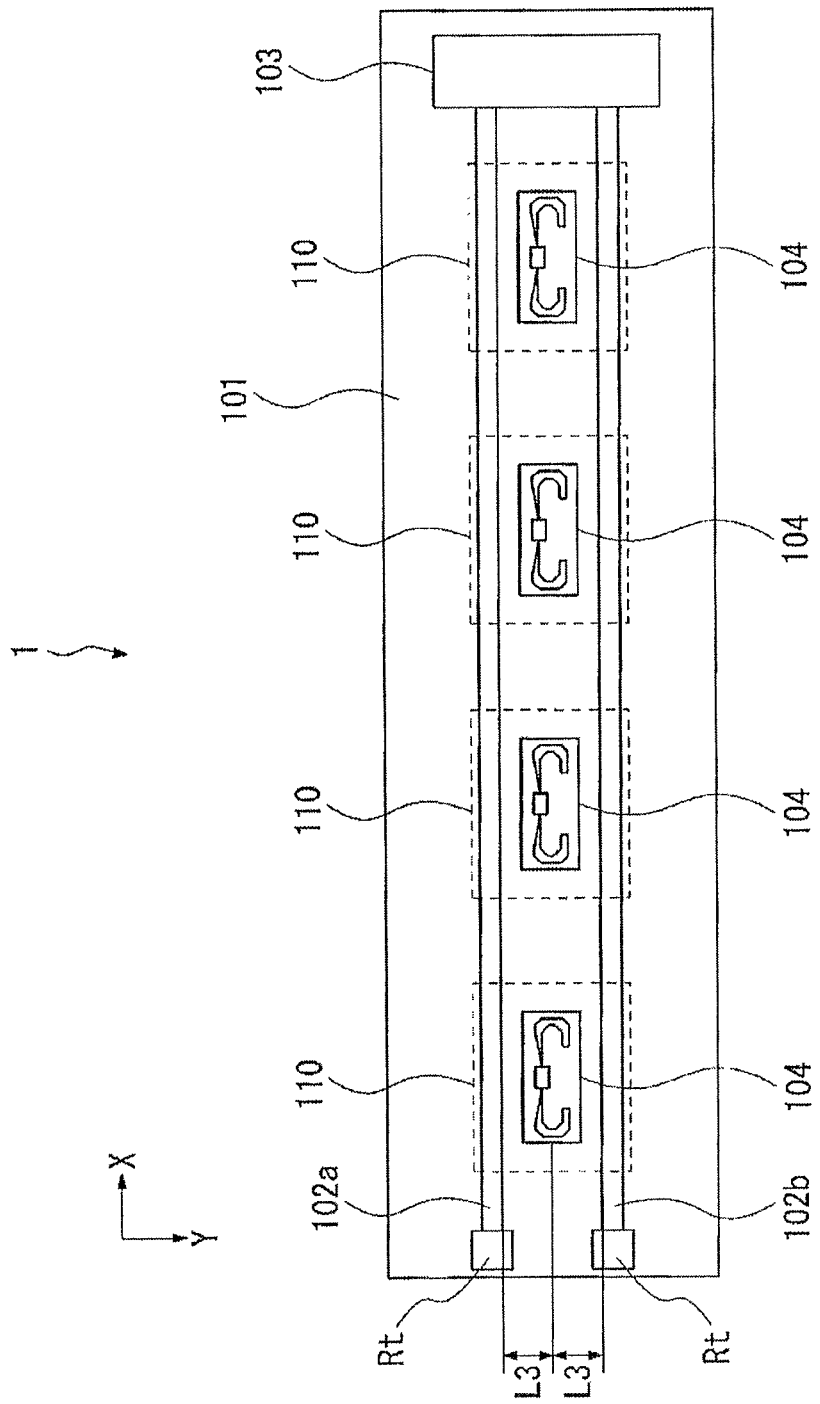
FIG. 2 is a top view of the article management system according to the first exemplary embodiment.

First, FIG. 2 illustrates a top view of the article management system 1 according to the first exemplary embodiment. FIG. 2 illustrates management-target article positioning regions 110 set over RF tags 104, respectively. An RF tag 104 is positioned so that, for example, a distance in a Y-direction between the RF tag 104 and the transmitting antenna 102a takes a same value, L3, as a distance in the Y-direction between the RF tag 104 and the receiving antenna 102b. One article to be managed 105 is mounted in a management-target article positioning region 110. As illustrated in FIG. 2, in the article management system 1, the transmitting antenna 102a and the receiving antenna 102b are positioned in parallel on the dielectric layer 101. However, the positioning of the transmitting antenna 102a and the receiving antenna 102b is merely an exemplification, and the antennas are not necessarily positioned in parallel and have only to be physically separated. In FIG. 2, an RFID 104 is positioned above a space between the transmitting antenna 102a and the receiving antenna 102b. A management-target article positioning region 110 is set at a location covering an RF tag 104. While a description "a location covering an RF tag 104" is used, the RF tag 104 and the article to be managed have only to be close to one another so as to be electromagnetically coupled with one another in a sufficiently strong manner, and therefore, the positioning of the RF tag 104 and the management-target article positioning region 110 is not limited thereto. Further, the RF tag 104 includes an RFID chip 111 and a tag antenna 112 (also referred to as tag transmission unit).

Figure 3:
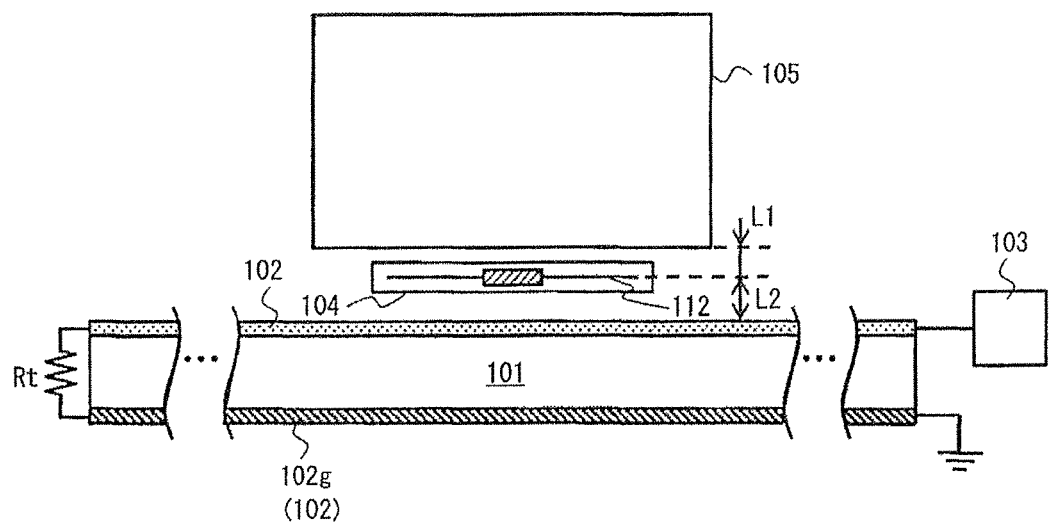
FIG. 3 is a sectional front view of the article management system according to the first exemplary embodiment.

Next, FIG. 3 illustrates a sectional front view of the article management system 1 according to the first exemplary embodiment. In FIG. 3, locations of the transmitting antenna 102a and the receiving antenna 102b can be expressed similarly, and therefore the transmitting antenna 102a and the receiving antenna 102b are collectively illustrated as a strip conductor 102. FIG. 3 illustrates an enlarged diagram of a region in which one article to be managed 105 is placed. As illustrated in FIG. 3, in the article management system 1, the strip conductor 102 is provided on the front surface of the dielectric layer 101 and the grounding conductor 102g is provided on the back surface of the dielectric layer 101 to constitute a microstrip line being a kind of an open-type transmission line forming the transmitting antenna 102a and the receiving antenna 102b. One end of the strip conductor 102 and the grounding conductor 102g are connected through a matched-termination resistor Rt. Further, the other end of the strip conductor 102 is connected to the RFID reader 103. Such connection provides the strip conductor 102 with matched termination. A cover mainly for improved durability may be positioned above the strip conductor 102 and below the grounding conductor 102g.

Further, as illustrated in FIG. 3, the article to be managed 105 is positioned at a location at which a distance between the article and a tag antenna 112 in an RF tag 104 is a first distance L1. The tag antenna 112 in the RF tag 104 is positioned at a location at which a distance between the transmitting antenna 102a and the receiving antenna 102b, and the tag antenna, is a second distance L2. Then, it is desirable that the first distance L1 and the second distance L2 be set to satisfy a relation of L1<L2. Consequently, a relation between coupling coefficients k1 and k2, to be described later, may be readily set to k1<k2. While FIG. 3 only illustrates distance relations between the article to be managed 105, the tag antenna 112, and the transmitting antenna 102a and the receiving antenna 102b, when, for example, the RF tag 104 is covered with a plastic plate or the like, the thickness of the plastic plate may be used in order to satisfy the aforementioned distance relations. Specifically, by incorporating the RF tag 104 into a plastic plate to form a sheet incorporating the RF tag with the plastic plate, the aforementioned relation between the first distance L1 and the second distance L2 may be secured. A technique of forming a sheet with a plastic plate is one form of securing the relation between the first distance L1 and the second distance L2, and another technique may be used. It is desirable that the distance in the description be given, more precisely, as an electrical length in consideration of a wavelength-shortening rate. Additionally, it is desirable that the distance in the description be given as a line-of-sight distance.

Figure 4:
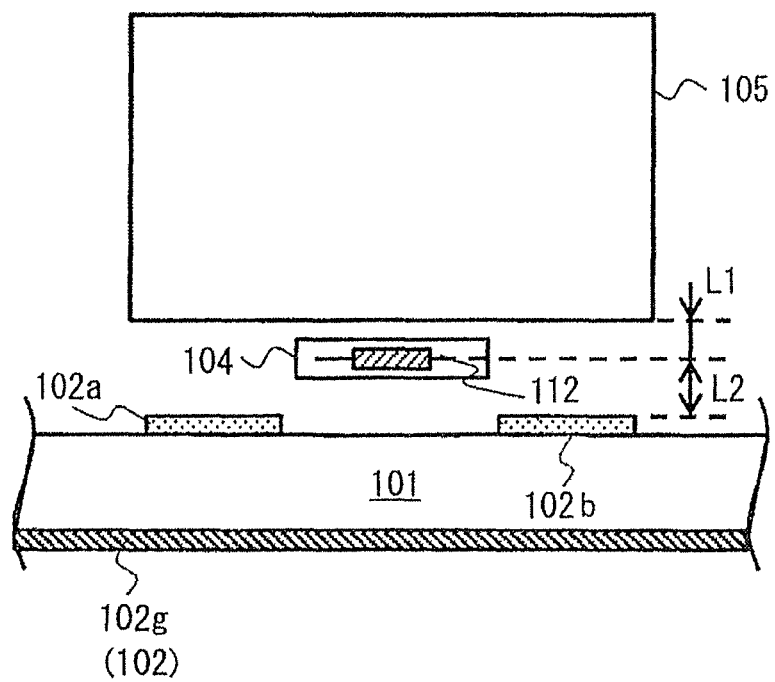
FIG. 4 is a sectional side view of the article management system according to the first exemplary embodiment.

Next, FIG. 4 illustrates a sectional side view of the article management system 1 according to the first exemplary embodiment. Similarly to FIG. 2, FIG. 4 illustrates an enlarged diagram of a region in which one article to be managed 105 is placed. As illustrated in FIG. 4, the strip conductor 102 according to the first exemplary embodiment is installed in part of a space below an RF tag 104. Further, in the article management system 1, the RF tag 104 and the article to be managed 105 are installed so that a relation between the first distance L1 and the second distance L2 satisfies the condition of L1<L2 in a side view as well.

With reference to aforementioned FIGS. 2 to 4, an effect of relations between the respective components of the article management system 1 will be further described in detail.

First, as illustrated in FIGS. 3 and 4, in the article management system 1, the article to be managed 105 is positioned at a location above the tag antenna 112 in the RF tag 104, where a distance between the article and the antenna is the first distance L1. Additionally, the transmitting antenna 102a and the receiving antenna 102b, being connected to the RFID reader 103, are positioned below the RF tag 104, with a distance between the transmitting antenna 102a and the receiving antenna 102b, and the tag antenna 112 in a vertical direction (Z-direction) being the second distance L2. Thus, in the article management system 1, the article to be managed 105 is positioned in a region other than an interspace region between the transmitting antenna 102a and the receiving antenna 102b, and the RF tag 104. Consequently, the interspace between the transmitting antenna 102a and the receiving antenna 102b, and the RF tag 104 is not blocked by the article to be managed 105. Further, in the article management system 1, a distance between the transmitting antenna 102a and the receiving antenna 102b, and the tag antenna 112 is referred to as the second distance L2 in a vertical direction (Z-direction).

As described above, the article management system 1 adjusts the first distance L1 between the article to be managed 105 and the tag antenna 112, and the second distance L2 being a line-of-sight distance between the transmitting antenna 102a and the receiving antenna 102b, and the tag antenna 112. Further, the article management system 1 adjusts the coupling coefficient k2 between the article to be managed 105 and the tag antenna 112, and the coupling coefficient k1 between the transmitting antenna 102a and the receiving antenna 102b, and the tag antenna 112, by adjusting the first distance L1 and the second distance L2. Then, the article management system 1 changes a signal strength between the transmitting antenna 102a and the receiving antenna 102b, and the tag antenna 112, in accordance with the coupling coefficient k2 changed by presence or absence of the article to be managed 105, and determines presence or absence of the article to be managed 105, in accordance with change in the signal strength.

Relations between the first distance L1, the second distance L2, and the coupling coefficients k1 and k2, and an effect of the article management system 1 according to the first exemplary embodiment based on the setting, will be described below. First, the present invention uses electromagnetic coupling, and a coupling coefficient indicating strength of the electromagnetic coupling may be evaluated relatively easily with an electromagnetic field simulator. Further, in description of electromagnetic coupling, assuming that a wavelength of a radio signal between the transmitting antenna 102a and the receiving antenna 102b, and the tag antenna 112 is denoted by $\lambda$, a region in which a distance from a wave source (such as an antenna) is less than $\lambda/2\pi$ ($\pi$ is a circular constant) is referred to as a reactive near field, a region in which the distance is greater than $\lambda/2\pi$ and less than $\lambda$ is referred to as a radiative near field, and the two regions are collectively referred to as a near-field region.

In the near-field region, an electromagnetic field takes on a complicated aspect, a quasi-static electromagnetic field, an induction electromagnetic field, and an radiation electromagnetic field exist, each of which having a non-negligible strength ratio, and a vector of an electromagnetic field combining the fields diversely changes spatially and temporally. Taking a case of a wave source being an infinitesimal dipole antenna as an example, an electric field E [V/m] and a magnetic field H [A/m], being formed by the antenna, can be expressed, in a spherical coordinate system (r, $\theta$, $\varphi$) and a phasor representation, by equations (1) to (4).

[Equation 1]

$$E_\theta = \frac{ql}{4\pi\varepsilon}\left\{\frac{1}{r^3} + \frac{1}{r^2}\cdot\frac{1}{(\lambda/2\pi)}\cdot e^{j\frac{\pi}{2}} + \frac{1}{r}\cdot\frac{1}{(\lambda/2\pi)^2}\cdot e^{j\pi}\right\}\cdot e^{-jkr}\cdot\sin\theta \quad (1)$$

[Equation 2]

$$E_r = \frac{ql}{2\pi\varepsilon}\left\{\frac{1}{r^3} + \frac{1}{r^2}\cdot\frac{1}{(\lambda/2\pi)}\cdot e^{j\frac{\pi}{2}}\right\}\cdot e^{-jkr}\cdot\cos\theta \quad (2)$$

[Equation 3]

$$H_\phi = \frac{ql}{4\pi\sqrt{\varepsilon\mu}}\left\{\frac{1}{r^2}\cdot\frac{1}{(\lambda/2\pi)}\cdot e^{j\frac{\pi}{2}} + \frac{1}{r}\cdot\frac{1}{(\lambda/2\pi)}\cdot e^{j\pi}\right\}\cdot e^{-jkr}\cdot\sin\phi \quad (3)$$

[Equation 4]

$$E_\phi = H_\theta = H_r = 0 \quad (4)$$

In aforementioned equations (1) to (4), an electric charge stored in the infinitesimal dipole antenna is denoted by q [C], a length of the antenna is denoted by l [m], a wavelength is denoted by $\lambda$ [m], and a distance between a wave source and an observation point is denoted by r [m]. Further, $\pi$ denotes a circular constant, $\in$ denotes a dielectric constant, and $\mu$ denotes permeability. In equations (1) to (4), a term proportional to $1/r^3$ represents a quasi-static electromagnetic field, a term proportional to $1/r^2$ represents an induction electromagnetic field, and a term proportional to $1/r$ represents a radiation electromagnetic field. The respective electromagnetic field components have different dependence on the distance r, and therefore relative strengths change, depending on the distance r.

Next, FIG. 5 illustrates a table illustrating dependence on a distance r normalized by a wavelength λ with respect to relative strengths of a quasi-electrostatic field, an induction electric field, and a radiation electric field in an electric field $E_\theta$. The second row of the table illustrated in FIG. 5 indicates a distance converted on the basis of a free space wavelength at 950 MHz being nearly equivalent to an RFID frequency permitted by the Japanese Radio Law in an ultra-high frequency (UHF) band.

As understood from the table illustrated in FIG. 5, as the distance r becomes larger, the respective electric field strengths become smaller, and respective component ratios also change. For example, in a region where r<λ/2π, respective electric field strengths of the quasi-electrostatic field, the induction electric field, and the radiation electric field become lower in this order, and in a region where r>λ/2π, respective electric field strengths of the quasi-electrostatic field, the induction electric field, and the radiation electric field become higher in this order. Additionally, in a region where r>λ, contributions of the quasi-electrostatic field and the induction electric field become extremely small, and in a region where r>λ, being a far field, the radiation electric field component exists almost exclusively. By contrast, in a region where r<λ, contributions of the quasi-electrostatic field and the induction electric field sufficiently remain, and in the reactive near field where r<λ/2π, contributions of the quasi-electrostatic field and the induction electric field are dominant. Further, as seen in equations (1) to (4), compared with the radiation electric field, the quasi-static electromagnetic field and the induction electromagnetic field have an r-direction component and a φ-direction component in addition to a θ-direction component, thus having components in diverse directions.

In general, compared with a radiation electromagnetic field radiated into space from an antenna to propagate, a quasi-static electromagnetic field and an induction electromagnetic field accumulating in proximity to an antenna are thus dominant in the reactive near field, and have high absolute electromagnetic field strengths. In the radiative near field, absolute electromagnetic field strength generally becomes lower as a distance from a wave source becomes longer. Further, relative strengths of a quasi-static electromagnetic field and an induction electromagnetic field become lower, and a relative strength of a radiation electromagnetic field becomes higher. As described above, a quasi-static electromagnetic field and an induction electromagnetic field exist in the near-field region, and these electromagnetic fields generate coupling between the transmitting antenna 102a and the receiving antenna 102b, and the tag antenna 112, and coupling between the tag antenna 112 and the article to be managed.

In a common passive RFID system using a UHF band or a microwave band, a distance r between the transmitting antenna 102a and the receiving antenna 102b, and the tag antenna 112 satisfies a relation of r>λ, and uses a radiation electromagnetic field for communication. In order to effectively generate the radiation electromagnetic field, a resonant-type antenna typified by a patch antenna is used as the transmitting antenna 102a and the receiving antenna 102b. When such a resonant-type antenna is used in the near-field region where r<λ, an electromagnetic field strength greatly changes by location along the antenna, due to a standing wave in the resonant-type antenna. For example, an amplitude is maximum around a peak of the standing wave, and an amplitude is zero at a midpoint of the standing wave.

Accordingly, when a distance r between the transmitting antenna 102a and the receiving antenna 102b, using such a resonant-type antenna, and the tag antenna 112 satisfies a relation of r<λ, in a part close to the midpoint of the standing wave in the transmitting antenna and the receiving antenna, the tag antenna is not able to receive a signal from the transmitting antenna and the receiving antenna, or a response signal strength is extremely low. In other words, a dead region exists, hindering use.

Consequently, the system described in PTL 5 inevitably has a form in which a radio wave is irradiated from a transmitting antenna and a receiving antenna, being sufficiently smaller than a shelf, and a large coverage area is taken, by installing an RFID reader sufficiently apart from the shelf on which an article is placed, a article to be managed 105, and an RF tag. Accordingly, the system described in PTL 5 requires a large space between the RFID reader and an RF tag. Further, depending on shelf material, particularly in case of a shelf of metallic material or the like, a multipath phenomenon may occur and tag reading may become unstable due to radio wave interference, hindering tag information reading, regardless of presence or absence of a article to be managed. Further, when a person or a thing comes between the transmitting antenna and the receiving antenna, and a location at which an article is positioned, a tag cannot be read, similarly to a case that an article is present, causing a problem of erroneous detection of an article despite absence thereof.

On the other hand, a coupling circuit may be formed by electromagnetic coupling between the antennas through a quasi-static electromagnetic field and an induction electromagnetic field, existing in the near-field region where r<λ, more preferably the reactive near field where r<λ/2π. In this case, a large space is not required between the RFID reader and an RF tag, as indicated in the condition. However, simple use of a resonant-type antenna for the transmitting antenna 102a and the receiving antenna 102b creates a dead region, hindering use. Further, a common size of a standing-wave antenna is around λ, and a coverage area becomes extremely small when used in proximity to a tag.

Accordingly, in the article management system 1 according to the first exemplary embodiment, the transmitting antenna 102a and the receiving antenna 102b, being connected to the RFID reader 103, are composed of open-type transmission lines with matched termination, and an RF tag 104 is positioned so that the open-type transmission line and a tag antenna 112 in the RF tag 104 are electromagnetically coupled. Then, by using the open-type transmission line, having a less amount of radio wave radiation, as the transmitting antenna 102a and the receiving antenna 102b of the RFID reader 103, the article management system 1 forms a coupling circuit by causing the transmitting antenna 102a and the receiving antenna 102b to electromagnetically couple with the tag antenna 112, through a quasi-static electromagnetic field and an induction electromagnetic field generated around the open-type transmission line. In other words, the open-type transmission line is used as a traveling-wave antenna operating in the near-field region. The configuration eliminates the need for a large space between the transmitting antenna 102a and the receiving antenna 102b, and an RF tag 104. Further, communication between the transmitting antenna 102a and the receiving antenna 102b, and the tag antenna 112 is performed through the coupling circuit at a short distance, and therefore, erroneous detection caused by occurrence of a multipath phenomenon, and a person or a thing coming between the transmitting antenna 102a and the receiving antenna 102b, and a location at which a article to be managed 105 is positioned, can be suppressed. Additionally, an open-type transmission line with matched termination is used as the transmitting antenna 102a and the receiving antenna 102b, and therefore a main component of an electromagnetic wave propagating through the antenna does not generate a standing wave, and propagates to the matched termination as a traveling wave. Not generating a standing wave strictly means a generated standing wave is sufficiently small, and normally means a standing wave ratio is less than or equal to 2, more preferably less than or equal to 1.2.

When a termination of a transmission line is matched with sufficient precision, or an electromagnetic wave propagating in the transmission line sufficiently attenuates near the termination, a big standing wave is not generated in the transmission line, and a traveling wave is a main component. Then, by use of an electromagnetic field distribution in such a transmission line, a traveling wave antenna may be formed. Additionally, an electromagnetic field formed in space around the line contains a relatively small amount of a radiation electromagnetic field and contains a static electromagnetic field and an induction electromagnetic field as main components. Electromagnetic field strengths of the static electromagnetic field and the induction electromagnetic field are higher than strength of the radiation electromagnetic field, and, even when the reader operates at a same output, an electromagnetic field strength obtained by an RF tag 104 is higher. That is, an environment not scattering a radiation electromagnetic field to surroundings, while securing tag operation, may be formed.

In a commonly used standing-wave-type antenna such as a patch antenna, an electromagnetic field distribution in proximity to the antenna is extremely non-uniform, depending on a standing wave inside the antenna, and a region in which a article to be managed 105 can be managed is limited, in order to avoid a dead part. By contrast, in a case of a traveling-wave antenna composed of the open-type transmission line according to the present exemplary embodiment, an unchanged part such as a node does not exist in an electromagnetic field distribution, even in proximity to the antenna, and every part is constantly changing. Consequently, even in the near-field region, an electromagnetic field accompanying a standing wave along the antenna is uniform, and therefore there is no area in which tag information in an RF tag 104 cannot be read. In other words, a degree of freedom in positioning of the transmitting antenna 102a and the receiving antenna 102b, and a tag antenna 112 is improved.

Further, the article management system 1 performs communication through electromagnetic coupling between the transmitting antenna 102a and the receiving antenna 102b, and the tag antenna 112, using the traveling wave as a signal, and therefore, in contrast to a resonant-type antenna, a dead region hindering use is not generated. Consequently, the article management system 1 is able to take a large coverage area, by extending the transmission line regardless of a wavelength, within a range in which strengths of a quasi-static electromagnetic field and an induction electromagnetic field generated around the open-type transmission line are high enough to operate the RF tag 104. In other words, the article management system 1 according to the first exemplary embodiment suppresses a radiation loss of electric power and facilitates expansion of the coverage area, by use of the aforementioned open-type transmission line.

The open-type transmission line in the description basically refers to a transmission line aiming at suppressing radiation and transmitting an electromagnetic wave in a longitudinal direction of the line, being an open type. A balanced-two-wire transmission line and a similar transmission line, transmission lines such as a microstrip line, a coplanar line, a slot line, and variants thereof such as a grounded coplanar line and a triplate line, may be given as examples. Further, an antenna extending in a planar manner, transferring a signal by changing an electromagnetic field in an interspace region between a mesh conductor part and a sheet conductor part, and a leak region outside the mesh conductor part, may also be used, depending on a condition. In the antenna extending in a planar manner, a standing wave exists in a mixed manner, and the antenna also operates as a traveling wave antenna, though incompletely, and may be used provided that non-uniformity of an electromagnetic field distribution generated by the standing wave is negligible. On the other hand, a shield-type transmission line not generating such an electromagnetic field around a transmission line, such as a coaxial cable, being provided with shielding around a transmission line, and a waveguide, cannot be used without some special means to leak the aforementioned electromagnetic field.

Further, there is an electromagnetic wave transmission sheet having an electromagnetic field in an interspace region between conductive sheet bodies facing one another, and causing an electromagnetic field to travel in a desired direction, by changing a voltage between the two conductive sheet bodies to change the electromagnetic field, and by changing the electromagnetic field to change a voltage between the conductive sheet bodies. From a broader viewpoint, the electromagnetic wave transmission sheet may also be considered as a kind of the open-type transmission line according to the present invention, when viewed in a longitudinal direction of the sheet. However, the electromagnetic wave transmission sheet is not necessarily considered optimum for implementation of the present invention, due to a standing wave in the sheet. Further, in the case of the electromagnetic wave transmission sheet, an upper surface of the waveguide forms a metal mesh sufficiently finer than a wavelength, and an evanescent wave may be considered to leak out from the upper surface. In general, such a transmission line provided with a plurality of slots with an interval, a width, and a length respectively being less than $1/10$ of the wavelength, from which an electromagnetic field leaks out, may be considered as a kind of the open-type transmission line in the article management system 1 according to the first exemplary embodiment.

On the other hand, a so-called crank-line antenna and a meander-line antenna, obtaining a certain radiation electromagnetic field strength by design of a crank shape aiming at strong radiation from an open-type transmission line, or by active use of a higher mode, and a traveling wave antenna aiming at electromagnetic radiation in the far field by use of a so-called leaky coaxial cable or the like, are different from the open-type transmission line in the article management system 1 according to the first exemplary embodiment. In these types of antennas, radiation is preferentially generated from a crank shape or a slot, cyclically provided in a size of around a wavelength, typically $1/10$ of a size of a wavelength or greater, and therefore an electromagnetic field strength greatly changes with location, similarly to the aforementioned resonant-type antenna. Accordingly, use in the near-field region may cause unstable tag information reading or failed tag reading depending on the location, and thus the use is hindered. Furthermore, frequency allocation for an RFID system in a UHF band differs from country to country, and is mostly distributed in a frequency range between 860 to 960 MHz. The range represents a broad fractional bandwidth of approximately 10%, requiring significant change in design of a resonance point of a resonant-type antenna, and a cycle of a crank, a meander, or a slot. By contrast, the article management system 1 according to the first exemplary embodiment inherently uses an open-type transmission line having an extremely wide bandwidth, and therefore a same antenna may be used for the transmitting antenna 102a and the receiving antenna 102b without a special change.

Further, the article management system 1 according to the first exemplary embodiment provides a management-target article positioning region 110 in which a article to be managed 105 is placed separately from an RF tag 104 so that the article to be managed 105 electromagnetically couples with a tag antenna 112 in the RF tag 104. Accordingly, when a article to be managed 105 is present, the article to be managed 105 and the tag antenna 112 form a coupling circuit, and therefore a resonance frequency of the tag antenna 112 changes and feeding point impedance of the tag antenna 112 changes, compared with a case that the article to be managed 105 is not present. The tag antenna 112 is generally constructed to maximize receiving sensitivity by resonating at a frequency of a signal used for communication in free space and adjusting feeding point impedance, and therefore the aforementioned change lowers receiving sensitivity, and further has an adverse influence on operation of the tag antenna 112 in transmitting a reflected signal to the RFID reader 103. Consequently, power receiving sensitivity to a signal used in communication also lowers. Further, a transmitting output of a signal reflected by the RF tag 104 also lowers. Accordingly, the RF tag 104 is not able to receive signal power from the RFID reader 103, strength of a received signal power is too low to secure operating power of the tag, or the tag is not able to generate a reflected electromagnetic field with a sufficient strength. Consequently, the RFID reader 103 becomes unable to read tag information in the RF tag 104. Alternatively, a strength and a phase of a reflected electromagnetic field arriving at the RFID reader 103 greatly change with resonance frequency change of the tag and the like. Specifically, when an article to be managed 105 is in the management-target article positioning region 110, tag information cannot be read, or a strength and a phase of a reflected electromagnetic field from the RF tag 104 greatly change, compared with a case that the article to be managed 105 is not present, and therefore the RFID reader 103 is able to detect presence of the article to be managed 105. In other words, as a result of the change in operation characteristic of the tag antenna 112, due to presence or absence of the article to be managed 105, the RFID reader 103 is able to detect change in strength and phase of the reflected signal from the RF tag 104, and is able to detect presence or absence of the article to be managed from the detection result.

Thus, in the article management system 1 according to the first exemplary embodiment, it is not necessarily required for detection of presence or absence of an article to be managed 105 that a line of sight between an RF tag 104 and the RFID reader 103 be blocked by the article to be managed 105, and a location for placing the article to be managed 105 has only to be provided separately from the tag antenna 112 (or the RF tag 104) so that the article to be managed 105 is electromagnetically coupled with the tag antenna 112, and therefore positioning of an article to be managed is not necessarily limited between the RFID reader 103 and the RF tag 104, enabling unlimited positioning.

Further, the article management system 1 according to the first exemplary embodiment observes that an article is positioned in proximity to the transmitting antenna 102a and the receiving antenna 102b, being supplied with power, not simply by change in operation characteristic of the transmitting antenna 102a and the receiving antenna 102b, and determines change in operation characteristic of the tag antenna 112, in accordance with change in a read signal of tag information in the RFID reader 103 through the transmitting antenna 102a and the receiving antenna 102b. By thus causing an RF tag 104 to lie in between, a degree of freedom of relative positioning of locations at which the transmitting antenna 102a, the receiving antenna 102b, and the article to be managed 105 are positioned, can be improved. Further, even with one each of a transmitting antenna 102a, a receiving antenna 102b, and an RFID reader 103, presence or absence of a plurality of articles to be managed 105 can be detected by positioning a plurality of RF tags 104. Furthermore, an electromagnetic field formed by the tag antenna 112 at a location at which an article to be managed 105 is positioned, includes components of a quasi-static electromagnetic field and an induction electromagnetic field, in addition to a radiation electromagnetic field. Consequently, the electromagnetic field components extend in various directions compared with a normal radiation electromagnetic field component in the far field. Therefore, the article management system 1 according to the first exemplary embodiment is able to improve a degree of freedom of relative positioning of a article to be managed and a tag.

Further, the article management system 1 according to the first exemplary embodiment is based on an RFID system in which an RF tag 104 has a unique ID (tag information), and multiple access may be performed, in accordance with the tag information. Accordingly, by associating tag information in an RF tag 104 with a location at which an article to be managed 105 is positioned, a location of an article to be managed 105 may be specified, in accordance with tag information in an unreadable RF tag 104. By contrast, when a article to be managed 105 is not present, an RF tag 104 responds to a signal from the RFID reader 103, and the RFID reader 103 is able to read tag information in the RF tag 104. Accordingly, when a article to be managed 105 is not present, the tag information in the RF tag 104 can be read at a strength of a normal reflected electromagnetic field, and therefore absence of a article to be managed 105 can be detected. Furthermore, the location at which a article to be managed 105 is not present can be specified from the read tag information in the RF tag 104. Further, when a plurality of articles to be managed 105 are managed, tag information associated with a location at which a article to be managed 105 is positioned, differs from one another, and therefore article management can be performed along with specifying a location. Being capable of detecting presence or absence of an article to be managed 105 as described above, the article management system 1 according to the first exemplary embodiment is able to manage presence or absence of a article to be managed 105 without the need for affixing an RF tag 104 to the article to be managed.

In the article management system 1 according to the first exemplary embodiment, a location for placing an article to be managed 105 has only to be provided separately from an RF tag 104 so that the article to be managed 105 is electromagnetically coupled with a tag antenna 112 in the RF tag 104, and therefore the RF tag 104 is not affixed to the article to be managed 105 and the RF tag 104 can be repeatedly used, resulting in a tag cost per article substantially being a value of the cost divided by a tag use count. In other words, it is needless to say that the problem of a high cost of an RF tag 104 can be solved by sufficiently repeated use.

Further, in the article management system 1 according to the first exemplary embodiment, an RF tag 104 is not affixed to an article to be managed 105, and therefore a problem of invasion of privacy and information security, due to improper reading of an RF tag 104 affixed to an article to be managed 105 does not occur. In other words, the article management system 1 according to the first exemplary embodiment does not cause a problem of improper reading of tag information by a third person.

Further, when a wavelength of a signal used in communication between the RFID reader 103 and an RF tag 104 is denoted by $\lambda$, the article management system 1 according to the first exemplary embodiment provides a management-target article positioning region 110 in which an article to be managed 105 is placed so that the first distance L1 between the article to be managed 105 and a tag antenna 112 satisfies a relation of $L1 \leq \lambda$. Further, in the article management system 1 according to the first exemplary embodiment, the second distance L2 being a line-of-sight distance between the transmitting antenna 102a and the receiving antenna 102b of the RFID reader 103, and a tag antenna 112 in an RF tag 104, satisfies a relation of $L2 \leq \lambda$. The distance in the article management system 1 according to the first exemplary embodiment refers to a distance in radio wave propagation, and roughly matches a geometrically shortest distance.

As long as the distance L1 between a management-target article positioning region 110 in which an article to be managed 105 is positioned and a tag antenna 112 in an RF tag 104 satisfies the relation of $L1 \leq \lambda$, the location at which the article is positioned is within a range of the near-field region viewed from the RF tag 104. Accordingly, when there are sufficient contributions by a quasi-electrostatic field and an induction electric field, an article to be managed 105 contains material with a high dielectric constant such as water, or metal, and the article to be managed 105 is in the management-target article positioning region 110, the tag antenna 112 is able to electromagnetically couple with the article to be managed 105 through the quasi-static electromagnetic field and the induction electromagnetic field. A human body contains a large amount of water and can be detected as an article to be managed 105, and therefore the system can be also used in flow-line management of people, and the like.

By setting the first distance L1 to a value satisfying $L1 \leq \lambda$, components of the quasi-static electromagnetic field and the induction electromagnetic field exist at a non-negligible strength in in the near-field region of the tag antenna 112, and the electromagnetic field components generate electromagnetic coupling between the tag antenna 112 and the article to be managed 105, through mutual inductance, capacitance, and the like. Consequently, presence or absence of the article to be managed 105 changes a circuit constant of the tag antenna 112, and changes an operation characteristic of the tag antenna 112. Further, as more clear-cut change by presence or absence of the article to be managed 105, the resonance frequency of the tag antenna 112 changes. When a commercially-available common RF tag is used as the RF tag 104 for system cost control, the antenna 112 is a standing-wave antenna based on a dipole antenna. In such an RF tag 104, high sensitivity is provided by tuning the resonance frequency of the tag antenna 112 to a radio communication frequency. Thus, a state that the resonance frequency of the tag antenna 112 resonates at a set frequency corresponds to a state of absence of an article to be managed 105.

Next, when an article to be managed 105 is placed on the RF tag 104, the tag antenna 112 couples with the article to be managed 105, and therefore the resonance frequency by and large lowers. Consequently, sensitivity of the tag antenna 112 at the radio communication frequency greatly lowers. For example, when operating power of the RFID chip 111 cannot be supplied due to degradation of the receiving sensitivity, the RF tag 104 does not respond to an inquiry from the RFID reader 103. Alternatively, even when operating power can be supplied, the tag antenna 112 is not able to generate an electromagnetic field change in space at a sufficient strength, by a modulation signal generated in the RFID chip 111.

Consequently, when an article to be managed 105 is present, the RF tag 104 stops responding to an inquiry from the RFID reader 103, or strength of a reflected electromagnetic field from the RF tag 104 greatly changes, compared with a case that the article to be managed 105 is not present. By the RFID reader 103 detecting the strength change in the reflected electromagnetic field, absence of the article to be managed 105 can be determined. The determination processing may be performed by, for example, a computer. As described above, the article management system 1 according to the first exemplary embodiment is able to detect presence or absence of an article to be managed 105, and manage presence or absence of the article to be managed 105, without affixing an RF tag 104 to the article to be managed 105.

Further, in order to generate change in a response of the RF tag 104 by presence or absence of an article to be managed 105 in the article management system 1 according to the first exemplary embodiment, the first distance L1 between the RF tag 104 and the article to be managed 105 has only to satisfy the relation of $L1 \leq \lambda$, and there is no need to block a line of sight between the transmitting antenna 102a and the receiving antenna 102b, and the RF tag 104, by the article to be managed 105. In other words, positioning of the article to be managed 105 is not limited between the tag antenna 112 in the RFID reader 103 and the RF tag 104, and a degree of freedom of positioning is improved. For example, when presence or absence of a commodity on a display shelf is detected, the transmitting antenna 102a and the receiving antenna 102b, and the RF tag 104 may be incorporated into the shelf board, providing aesthetical improvement by hiding the antennas.

While a scheme of detecting change in signal strength by the resonance frequency of the tag antenna 112 deviating from the radio communication frequency has been mainly described, the present invention is not limited thereto. When the resonance frequency deviates, the reader may detect presence or absence of an article, by sweeping a radio communication frequency within a legally permissible range to detect the deviation of the resonance frequency. Further, a phase greatly changes around the resonance frequency. Accordingly, it is needless to say that presence or absence of an article may be detected also by observing the phase change.

Further, similarly to the aforementioned first distance L1, as long as the line-of-sight distance L2 between the transmitting antenna 102a and the receiving antenna 102b, and a tag antenna 112 satisfies the relation of $L2 \leq \lambda$, the transmitting antenna 102a and the receiving antenna 102b, and the tag antenna 112 are within a range of the near-field region. The line-of-sight distance L2 refers to a distance between the strip conductor 102 being a particularly strong wave source in the transmitting antenna 102a and the receiving antenna 102b, and the tag antenna 112. By setting the line-of-sight distance L2 less than or equal to $\lambda$, sufficient contributions from a quasi-electrostatic field and an induction electric field is provided, and the transmitting antenna 102a and the receiving antenna 102b can be electromagnetically coupled with the tag antenna 112. The article management system 1 according to the first exemplary embodiment determines presence or absence of an article particularly with an analog value being a strength of a reflected electromagnetic field from the RF tag 104, and therefore change in reflected electromagnetic field strength due to radio wave interference tends to cause erroneous detection. However, in the configuration of the article management system 1 according to the first exemplary embodiment, radio communication between the transmitting antenna 102a and the receiving antenna 102b, and the tag antenna 112 is mainly performed by a direct wave, and radio wave interference accompanying a multipath phenomenon is not likely to occur. Accordingly, erroneous detection can be suppressed. Further, an electromagnetic field formed by the respective antennas of the RFID reader 103 and the RF tag 104 includes components of a quasi-static electromagnetic field and an induction electromagnetic field, in addition to a radiation electromagnetic field. Consequently, the electromagnetic field components extend in various directions compared with a normal radiation electromagnetic field component in the far field only. Therefore the article management system 1 according to the first exemplary embodiment is able to improve a degree of freedom of relative positioning of the transmitting antenna 102a and the receiving antenna 102b, and the RF tag 104.

Further, the article management system according to the first exemplary embodiment determines presence or absence of an article with an analog value such as change in strength and phase of a reflected electromagnetic field from the RF tag 104, and change in resonance frequency of the tag antenna 112, and therefore radio wave interference accompanying an ambient environment causes erroneous detection. However, in the article management system 1 according to the first exemplary embodiment, by satisfying the relation of $L2 \leq \lambda$, radio communication between the transmitting antenna 102a and the receiving antenna 102b, and the tag antenna 112 is mainly performed by a direct wave, and radio wave interference accompanying a multipath phenomenon reflecting the ambient environment is not likely to occur. Accordingly, erroneous detection can be suppressed. In a particular case of managing presence or absence of a commodity on a shelf, while the shelf may often be a metal or a metallic refrigeration case, the system can be stably operated even in such an environment.

Furthermore, in the article management system 1 according to the first exemplary embodiment, by satisfying the relation of $L2 \leq \lambda$, the line-of-sight distance L2 between the transmitting antenna 102a and the receiving antenna 102b, and the RF tag 104 becomes less than or equal to approximately 0.3 m in a UHF band being one of RFID standard frequencies, and less than or equal to approximately 0.12 m in a 2.4 GHz band. Besides, the distance L1 between the management-target article positioning region 110 and the RF tag 104 also satisfies the relation of $L1 \leq \lambda$, and therefore, similarly, the distance becomes less than or equal to approximately 0.3 m in a UHF band being one of RFID standard frequencies, and less than or equal to approximately 0.12 m in a 2.4 GHz band. Consequently, an interval between the transmitting antenna 102a and the receiving antenna 102b, and the management-target article positioning region 110 is of the same order of magnitude, and is narrowed. Therefore, by narrowing an interval between the RF tag 104 or the transmitting antenna 102a and the receiving antenna 102b, and the article to be managed 105, by use of the article management system 1 according to the first exemplary embodiment, an incident of a person or a thing different from the article to be managed 105 coming in can be controlled, and erroneous detection can be suppressed.

Further, when a circular constant is denoted by $\pi$, it is desirable in the article management system 1 according to the first exemplary embodiment that the first distance L1 satisfies a relation of $L1 \leq \lambda/2\pi$. When the article to be managed 105 has influence on a frequency characteristic of the tag antenna 112, in a case the first distance L1 located in the reactive near field in which the relation of $L1 \leq \lambda/2\pi$ is satisfied, a strength of an electromagnetic field formed by the tag antenna 112 is higher, compared with a case of $L1 > \lambda/2\pi$ in the radiative near field. Additionally, contributions of a quasi-static electromagnetic field and an induction electromagnetic field, remaining in proximity to the antenna becomes relatively larger, and a contribution by a radiation electromagnetic field becomes smaller. Accordingly, in the article management system 1 according to the first exemplary embodiment, coupling between the article to be managed 105 and the tag antenna 112 becomes stronger. Consequently, influence of presence or absence of the article to be managed 105 on an operation characteristic of the tag antenna 112 becomes larger. Therefore, a change in a reflected electromagnetic field transmitted from the RF tag 104 to the RFID reader 103 becomes larger in the article management system 1 according to the first exemplary embodiment, making the system an article management system tolerant of disturbance and noise, and capable of suppressing erroneous detection.

Further, it is desirable in the article management system according to the first exemplary embodiment that the line-of-sight distance L2 satisfies a relation of $L2 \leq \lambda/2\pi$. By the line-of-sight distance L2 thus satisfying the relation of $L2 \leq \lambda/2\pi$ in the article management system 1 according to the first exemplary embodiment, contributions of a quasi-static electromagnetic field and an induction electromagnetic field, remaining in proximity to the antenna, becomes relatively larger, compared with a case that the line-of-sight distance L2 satisfies a relation of $L2 > \lambda/2\pi$, and coupling between the transmitting antenna 102a and the receiving antenna 102b, and the tag antenna 112 becomes stronger. Accordingly, in the article management system 1 according to the first exemplary embodiment, communication between the RFID reader 103 and the RF tag 104 also becomes insusceptible to disturbance and noise. Thus, the article management system 1 according to the first exemplary embodiment is able to provide an article management system insusceptible to disturbance and noise. Further, electromagnetic field components of a quasi-static electromagnetic field, an induction electromagnetic field, and a radiation electromagnetic field exist in a mixed manner at sufficient strengths, and a direction of the vector also changes in a temporally various manner, and therefore the article management system 1 according to the first exemplary embodiment is able to improve a degree of freedom of relative directions of the transmitting antenna 102a and the receiving antenna 102b, and the tag antenna 112.

Furthermore, in the article management system 1 according to the first exemplary embodiment, by satisfying the relation of $L2 \leq \lambda/2\pi$, a line-of-sight distance between the transmitting antenna 102a and the receiving antenna 102b, and the RF tag 104 becomes less than or equal to approximately 0.05 m in a UHF band being one of RFID standard frequencies, and less than or equal to approximately 0.02 m in a 2.4 GHz band. Accordingly, the article management system 1 according to the first exemplary embodiment is able to provide an article management system not requiring a large space between the transmitting antenna 102a and the receiving antenna 102b, and the RF tag 104. For example, it becomes feasible to house the transmitting antenna 102a and the receiving antenna 102b, the RF tag 104, and an article to be managed in a display shelf. Additionally, a narrowed interval further controls an incident of a person or a thing coming in between, to suppress erroneous detection due to blocking a line of sight.

By contrast, in a commonly known case of management by affixing an RF tag to a commodity on a display shelf, an affixing location of an RF tag changes by commodity to which the tag is affixed. Accordingly, satisfying the aforementioned relation of $L2 \leq \lambda/2\pi$ limits a type of a commodity or limits an affixing location of an RF tag, and therefore is not preferable. Consequently, when an RF tag is affixed to an article to be managed for management, it is required to use an antenna using a radiation electromagnetic field capable of communicating to the far field, so that the transmitting antenna and the receiving antenna, and the RF tag are able to communicate at a rather long distance. Accordingly, use of an open-type transmission line basically aiming at suppressing radiation and transmitting an electromagnetic wave in a longitudinal direction of the line, is not suited, and a normally used resonant-type antenna or a leaky coaxial cable is used.

However, when such a transmitting antenna and a receiving antenna, generating a radiation electromagnetic field with high efficiency, are used, a reading region broadens because strength of the radiation electromagnetic field attenuates only in proportion to $1/r$ with respect to a distance. Consequently, a problem related to commodity management such as reading an RF tag affixed to a commodity on an adjacent but separate shelf, occurs.

However, in the article management system 1 according to the first exemplary embodiment, an RF tag 104 is not affixed to a commodity, and therefore it is easy to, for example, lay the transmitting antenna 102a and the receiving antenna 102b on a bottom surface of a display shelf, position the RF tag 104 thereon so as to satisfy the relation of $L2 \leq \lambda/2\pi$, by adjusting a coupling coefficient, and further position the commodity being a managed object thereon. Accordingly, in the article management system 1 according to the first exemplary embodiment, an open-type transmission line basically aiming at suppressing radiation and transmitting an electromagnetic wave in a longitudinal direction of the line, can be used. By using the transmitting antenna 102a and the receiving antenna 102b thus suppressing radiation, a strength of which attenuating only in proportion to $1/r$, and using a quasi-static electromagnetic field attenuating in proportion to $1/r^3$ and an induction electromagnetic field attenuating in proportion to $1/r^2$ as main electromagnetic field components, when managing presence or absence of a commodity on the display shelf, it becomes easy to limit a region in which an RF tag 104 is read with one transmitting antenna 102a and one receiving antenna 102b, to perform commodity management, thus making a problem of reading an RF tag 104 on an adjacent but separate shelf not likely to occur. While the example of commodity management on a display shelf has been described, it is needless to say that, even when managing another shelf or a floor-positioned article, it is similarly easy to limit a region in which an RF tag 104 is read with one transmitting antenna 102a and one receiving antenna 102b to limit a region in which article management is performed.

Further, it is desirable in the article management system 1 according to the first exemplary embodiment that the first distance L1 and the second distance L2 satisfy a relation of L2>L1. While a strength of electromagnetic coupling changes with configuration of an antenna and a resonator, and a characteristic of a medium between antennas, the strength also depends greatly on distance. By setting L2>L1, the article management system 1 according to the first exemplary embodiment is able to make the coupling coefficient k2 between a management-target article positioning region 110 in which an article to be managed 105 is positioned, and a tag antenna 112, greater than the coupling coefficient k1 between the transmitting antenna 102a and the receiving antenna 102b, and the tag antenna 112. Specifically, by securing the relation of L2>L1, a change in a reflected wave strength due to frequency characteristic change of the tag antenna 112 due to presence or absence of the article, becomes greater than maintenance of communication between the transmitting antenna 102a and the receiving antenna 102b, and the tag antenna 112. That is, the article management system 1 according to the first exemplary embodiment is able to securely capture presence or absence of the article to be managed 105, and therefore is able to suppress erroneous detection.

Further, it is desirable in the article management system 1 according to the first exemplary embodiment that the coupling coefficient k1 between the transmitting antenna 102a and the receiving antenna 102b, and the tag antenna 112 be set to a value greater than or equal to $10^{-5}$. Power receiving sensitivity providing an operation limit of an existing RF tag in a UHF band is approximately −20 dBm. Meanwhile, an output of a high-power UHF-band RFID reader is 30 dBm. Accordingly, a value of the coupling coefficient k1 being $10^{-5}$ or more enables electric power feed for operation of a UHF-band RF tag.

Further, it is desirable in the article management system 1 according to the first exemplary embodiment that the coupling coefficient k1 between the transmitting antenna 102a and the receiving antenna 102b, and the tag antenna 112 be set to a value less than or equal to $10^{-2}$. When the tag antenna 112 is considered as a dipole resonator, electromagnetic coupling between the transmitting antenna 102a and the receiving antenna 102b (such as an open-type transmission line), and the tag antenna 112 may be interpreted circuit-wise that an open-type transmission line is coupled with a resonator. Accordingly, an excessively large coupling coefficient greatly influences operation of the open-type transmission line, and consequently influences operation of another RF tag 104 as a coupling resonator system. A situation of a plurality of resonators coupled with an open-type transmission line in parallel may be considered as a band-rejection filter circuit. In that case, an unloaded Q factor of a tag antenna, using copper or aluminum, in a UHF-band RF tag at normal temperature is mostly 100 or less, and therefore a value of the coupling coefficient k1, determining a fractional bandwidth, being $10^{-2}$ or less hardly influences operation of the open-type transmission line. Therefore, by setting the coupling coefficient k1 to a value less than or equal to $10^{-2}$, influence of coupling of the tag antenna 112 on the open-type transmission line can be suppressed, and mutual influence of RFID readers 103 coupled with the open-type transmission line in parallel can be further suppressed.

Further, it is desirable in the article management system 1 according to the first exemplary embodiment that the coupling coefficient k1 between the transmitting antenna 102a and the receiving antenna 102b, and the tag antenna 112, and the coupling coefficient k2 between an article to be managed 105 and the tag antenna 112 when the article to be managed 105 is placed in a management-target article positioning region 110, satisfy a relation of k1<k2. In the present invention, by setting k1<k2, that is, by setting the coupling coefficient k2 between the management-target article positioning region 110 and the tag antenna 112 greater than the coupling coefficient k1 between the transmitting antenna 102a and the receiving antenna 102b, and the tag antenna 112, a change in a reflected signal strength due to frequency characteristic change of the tag antenna 112 due to presence or absence of the article, becomes greater than maintenance of communication between the transmitting antenna 102a and the receiving antenna 102b, and the tag antenna 112. That is, the article management system 1 according to the first exemplary embodiment is able to securely capture presence or absence of the article to be managed 105, and therefore is able to suppress erroneous detection.

Furthermore, in the article management system 1, a reflected wave of a transmission signal is generated at the transmitting antenna 102a.

Figure 6:
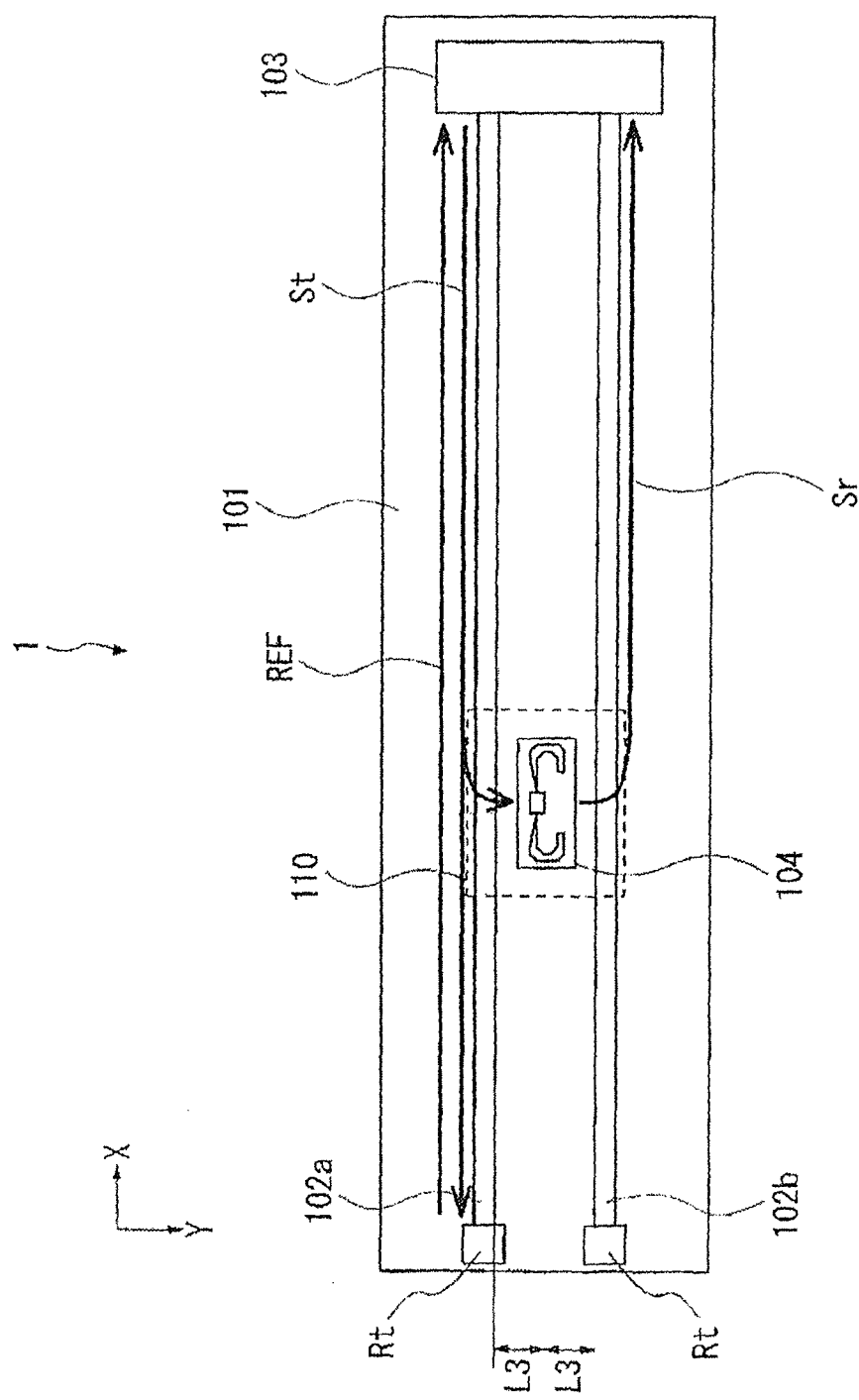
FIG. 6 is a top view of a principal part illustrating a case that a reflected wave is generated in the article management system according to the first exemplary embodiment.

FIG. 6 is a top view of a principal part illustrating a case that a reflected wave is generated in the article management system 1 according to the first exemplary embodiment. For simplification of the drawing, one each of an RFID tag 104 and a management-target article positioning region 110 are illustrated in FIG. 6. An end of the transmitting antenna 102a is terminated by a matched-termination resistor Rt. A transmission signal St is transmitted from the RFID reader 103 to the transmitting antenna 102a. In this case, a reflected wave REF is actually generated at the end of the transmitting antenna 102a on the matched-termination resistor Rt side. When receiving the transmission signal St, the RF tag 104 outputs a response signal Sr not having directivity. Accordingly, the response signal Sr arrives at both the transmitting antenna 102a and the receiving antenna 102b.

When the response signal Sr is attempted to be received through the transmitting antenna 102a, an S/N of the response signal Sr is degraded due to influence of the reflected wave as described above. However, the article management system 1 receives the response signal Sr arriving at the receiving antenna 102b. The transmission signal St is not input to the receiving antenna 102b, and therefore a reflected wave is not generated as a matter of course. Therefore, the article management system 1 is able to receive the response signal Sr without being influenced by a reflected wave within the antenna.

As described above, the configuration is able to provide an article management system capable of receiving a response signal from an RF tag with high sensitivity, without being influenced by a reflected wave within an antenna.

While positional relations between the transmitting antenna 102a, the receiving antenna 102b, the RF tag 104, and the article to be managed 105 according to the aforementioned first exemplary embodiment have been specifically described, relative positions and directions of the components are not limited to the specific example illustrated in FIG. 2.

Second Exemplary Embodiment

Figure 7:
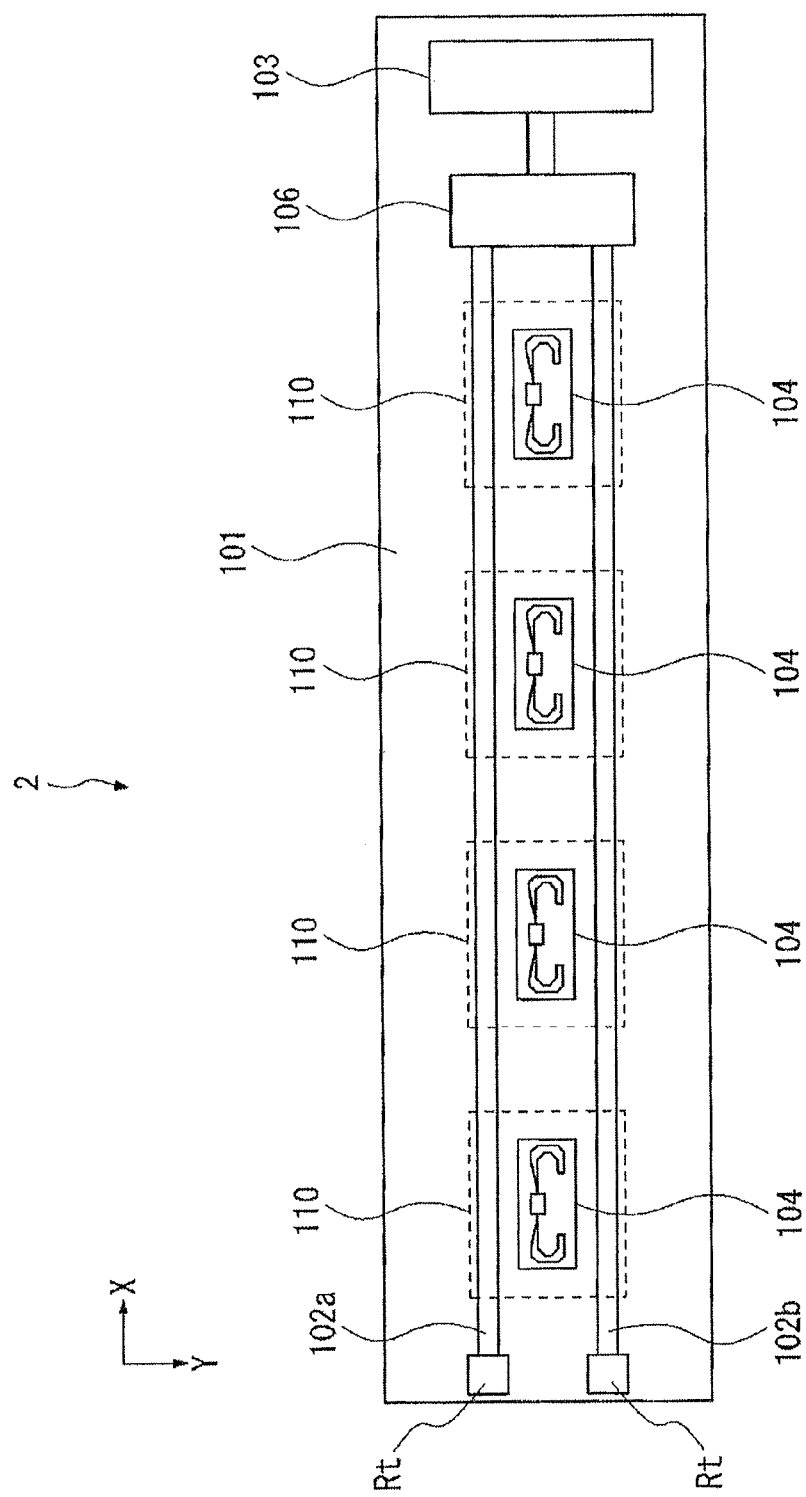
FIG. 7 is a top view of an article management system according to a second exemplary embodiment.

An article management system 2 according to a second exemplary embodiment will be described. FIG. 7 illustrates a top view of the article management system 2 according to the second exemplary embodiment. As illustrated in FIG. 7, the article management system 2 has a configuration adding a circulator 106 to the article management system 1 according to the first exemplary embodiment. The circulator 106 is inserted between a transmitting antenna 102a and a receiving antenna 102b, and an RFID reader 103.

The circulator 106 is able to pass a signal flowing in a forward direction only. The circulator 106 according to the present exemplary embodiment transfers a transmission signal from the RFID reader 103 to the transmitting antenna 102a. Accordingly, the transmission signal is not transferred from the RFID reader 103 to the receiving antenna 102b. Further, the circulator 106 transfers a response signal from the receiving antenna 102b to the RFID reader 103. Accordingly, the response signal is not transferred to the RFID reader 103 through the transmitting antenna 102a. The remaining configuration of the article management system 2 is similar to the article management system 1 according to the first exemplary embodiment, and therefore description thereof is omitted.

It can be understood from the above that the article management system 2 is able to detect presence or absence of a article to be managed 105 by use of an RF tag 104, similarly to the article management system 1.

In the article management system 1, the RFID reader 103 is connected to the transmitting antenna 102a and the receiving antenna 102b. Accordingly, the number of communication ports on the RFID reader 103 required for communication with the RF tag 104 is two. By contrast, the article management system 2 uses the circulator 106, and therefore the number of communication port on the RFID reader 103 required for communication with the RF tag 104 is one. Consequently, the article management system 2 is able to reduce the number of communication ports on the RFID reader 103, and therefore is more advantageous than the article management system 1 from viewpoints of miniaturization and cost reduction of the RFID reader 103.

Third Exemplary Embodiment

Figure 8:
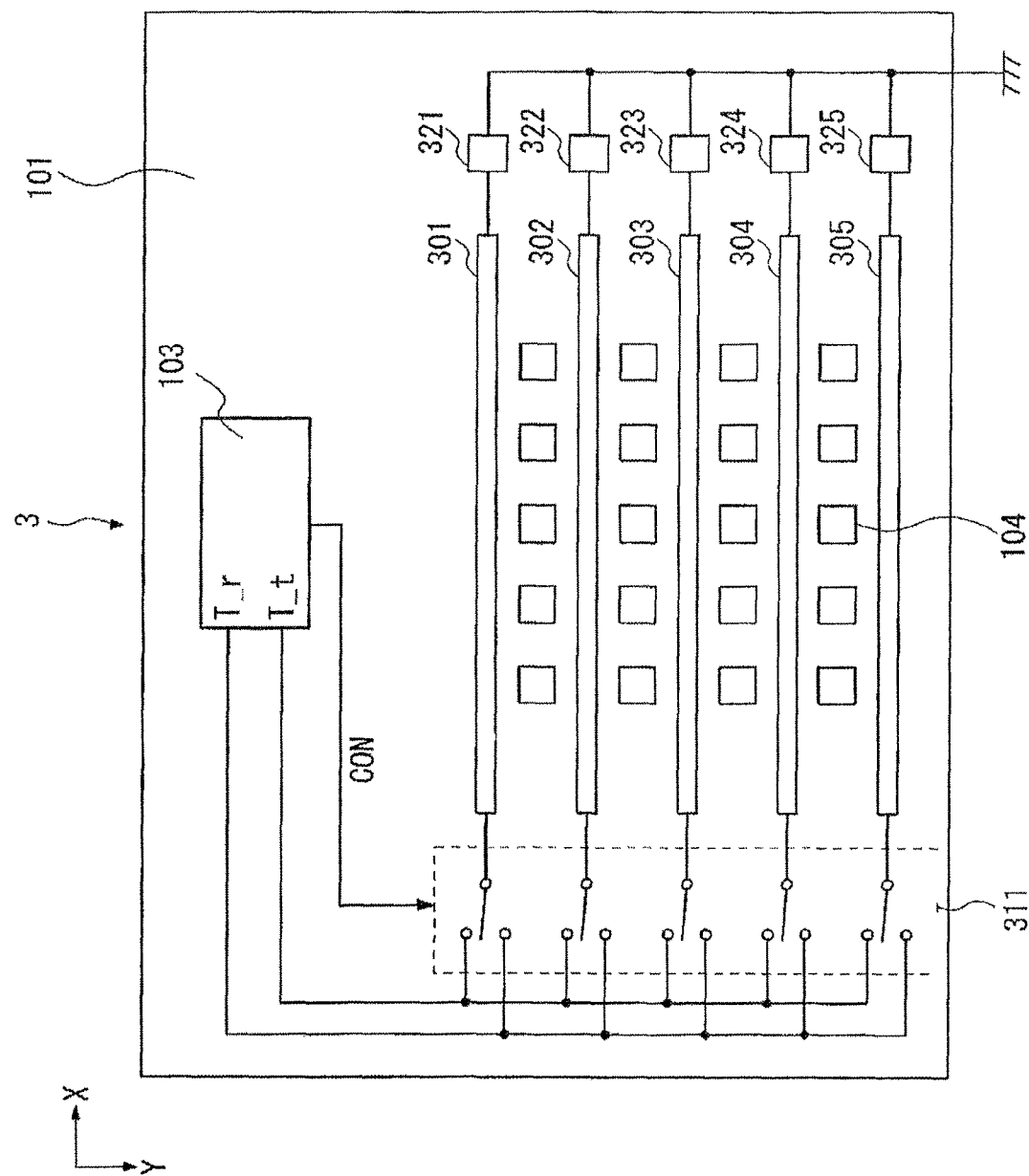
FIG. 8 is a top view of an article management system according to a third exemplary embodiment.

An article management system 3 according to a third exemplary embodiment will be described. FIG. 8 illustrates a top view of the article management system 3 according to the third exemplary embodiment. As illustrated in FIG. 8, the article management system 3 includes reader antennas 301 to 305, an RFID reader 103, an RF tag 104, a switching circuit 311, and matched-termination resistors 321 to 325. The reader antennas 301 to 305 are composed of a dielectric layer 101, a strip conductor 102, a grounding conductor 102g, and a matched-termination resistor, similarly to the transmitting antenna 102a and the receiving antenna 102b according to the first and second exemplary embodiments. The reader antennas 301 to 305 are sequentially positioned in parallel. In FIG. 8, the reader antennas 301 to 305 extend in an X-direction, and positioned in parallel in a Y-direction.

The switching circuit 311 is inserted between one end of each of the reader antennas 301 to 305 (also referred to as a first end) and the RFID reader 103. The switching circuit 311 is configured to be able to connect first ends of one or more reader antennas used as transmitting antennas, out of the reader antennas 301 to 305, to the RFID reader 103. Further, the switching circuit 311 is configured to be able to connect first ends of one or more reader antennas used as receiving antennas, out of the reader antennas 301 to 305, to the RFID reader 103. It is assumed in the description that connection switching of the switching circuit 311 is controlled by a control signal CON from the RFID reader 103.

The matched-termination resistors 321 to 325 are connected between the respective other ends of the reader antennas 301 to 305 (also referred to as second ends) and a ground.

Next, an operation of the article management system 3 will be described. The article management system 3 uses one or more of the reader antennas 301 to 305 as transmitting antennas, and uses one or more of the reader antennas 301 to 305 as receiving antennas. An example of the article management system 3 using one each of a transmitting antenna and a receiving antenna will be described below.

Figure 9:
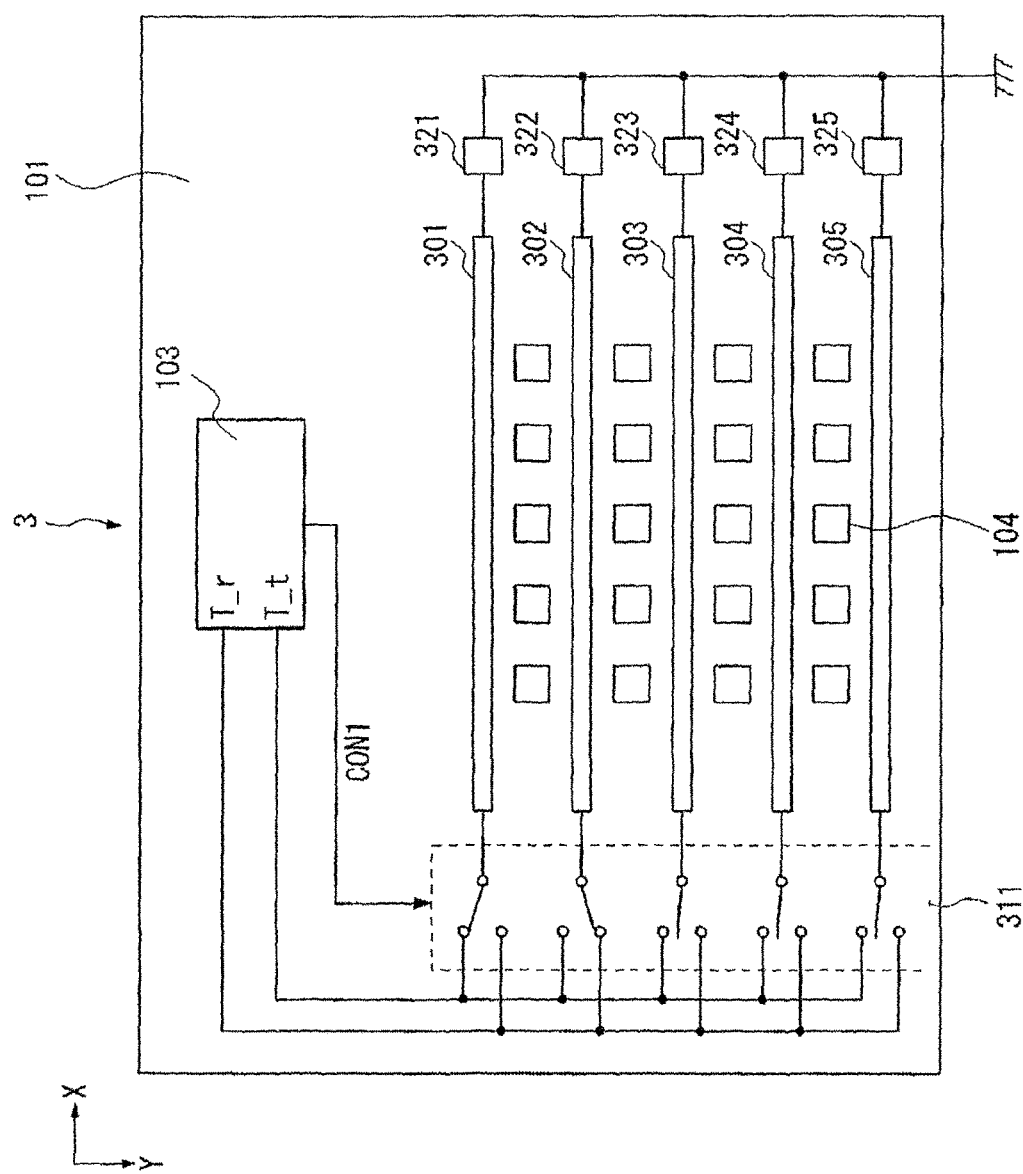
FIG. 9 is a top view illustrating an example of article detection in the article management system according to the third exemplary embodiment.

An example of article detection in the article management system 3 according to the third exemplary embodiment will be described. FIG. 9 is a top view illustrating an example of article detection in the article management system 3 according to the third exemplary embodiment. In FIG. 9, the switching circuit 311 connects the reader antenna 301, as a transmitting antenna, to a transmitting terminal T_t of the RFID reader 103. The switching circuit 311 connects the reader antenna 302, as a receiving antenna, to a receiving terminal T_r of the RFID reader 103. Consequently, connections between the reader antennas 303 to 305 and the RFID reader 103 are opened.

As described above, the configuration illustrated in FIG. 9 is able to provide a configuration similar to the article management system 1 according to the first exemplary embodiment. Specifically, a transmission signal St can be transmitted from the reader antenna 301 being a transmitting antenna, and a response signal Sr can be received by the reader antenna 302 being a receiving antenna.

Figure 10:
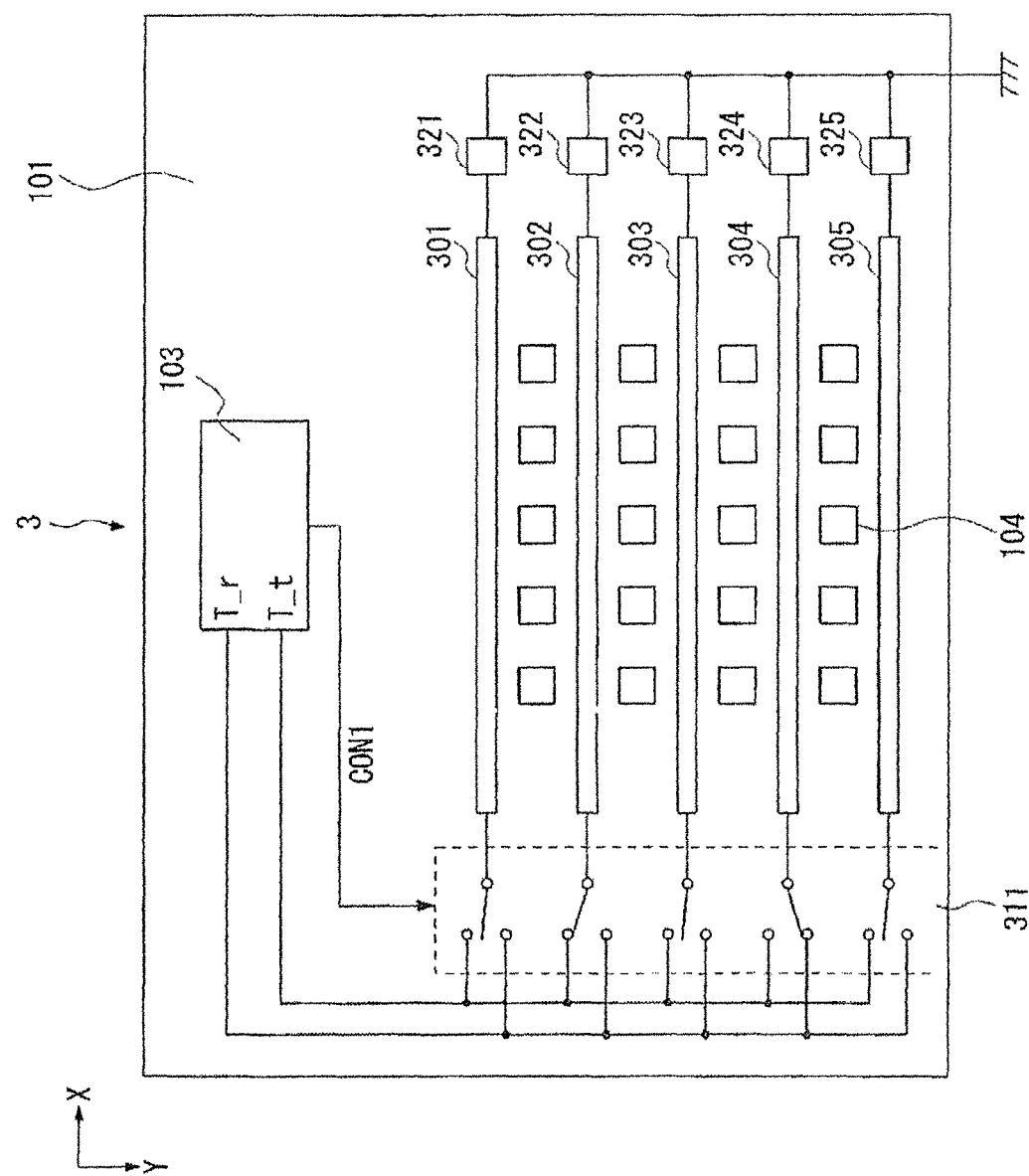
FIG. 10 is a top view illustrating another example of article detection in the article management system according to the third exemplary embodiment.

Another example of article detection in the article management system 3 according to the third exemplary embodiment will be described. FIG. 10 is a top view illustrating another example of article detection in the article management system 3 according to the third exemplary embodiment.

In FIG. 10, the switching circuit 311 connects the reader antenna 302, as a transmitting antenna, to the transmitting terminal T_t of the RFID reader 103. The switching circuit 311 connects the reader antenna 304, as a receiving antenna, to the receiving terminal T_r of the RFID reader 103. Consequently, connections between the reader antennas 301, 303 and 305, and the RFID reader 103 are opened.

As described above, the configuration illustrated in FIG. 10 is able to provide a configuration similar to the article management system 1 according to the first exemplary embodiment. Specifically, a transmission signal St can be transmitted from the reader antenna 302 being a transmitting antenna, and a response signal Sr can be received by the reader antenna 304 being a receiving antenna. Further, it can be understood that article detection can be performed even when the transmitting antenna is not adjacent to the receiving antenna, in contrast to the configuration illustrated in FIG. 9.

Selections of the transmitting antenna and the receiving antenna illustrated in FIGS. 9 and 10 are merely examples. In other words, any of the reader antennas 301 to 305 may be used as a transmitting antenna, and any of the reader antennas 301 to 305 other than the transmitting antenna may be used as a receiving antenna.

Further, the number of the transmitting antenna and the number of the receiving antenna are not respectively limited to one. The number of the transmitting antennas may be one or more, and the number of the receiving antennas may be one or more, to the extent that article detection can be performed.

Further, the number of the reader antennas is not limited to five, and may be set to any number greater than or equal to three.

The configuration of the switching circuit 311 is merely an exemplification, and any configuration capable of connecting a reader antenna to the RFID reader 103 may be employed. Further, control of the switching circuit 311 is not limited to be performed by the RFID reader 103.

Fourth Exemplary Embodiment

Figure 11:
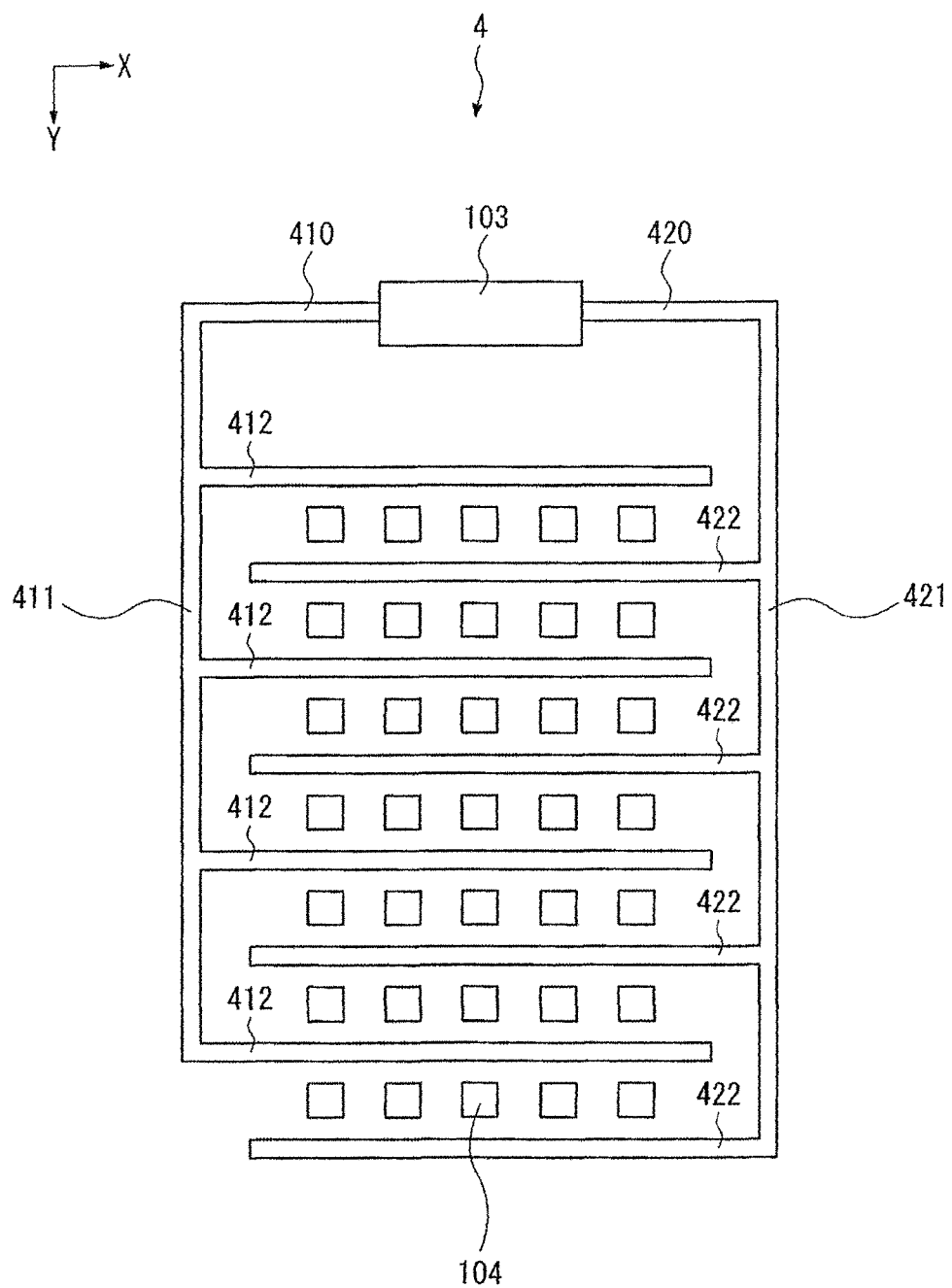
FIG. 11 is a top view of an article management system according to a fourth exemplary embodiment.

An article management system 4 according to a fourth exemplary embodiment will be described. FIG. 11 illustrates a top view of the article management system 4 according to the fourth exemplary embodiment. As illustrated in FIG. 11, the article management system 4 has a configuration in which the transmitting antenna 102a and the receiving antenna 102b in the article management system 1 according to the first exemplary embodiment are replaced by a transmitting antenna 410 and a receiving antenna 420, respectively. The remaining configuration of the article management system 4 is similar to the article management system 1 according to the first exemplary embodiment, and therefore description thereof is omitted. For simplification of the drawing, illustration of a matched-termination resistor is omitted in FIG. 11.

The transmitting antenna includes lines 410 to 412. One end of the line 410 is connected to an RFID reader 103. The line 411 extends in a Y-direction, and a center part thereof is connected to the other end of the line 410. The line 412 is formed to extend in an X-direction, and a plurality thereof are positioned side by side in the Y-direction. One end of each of the plurality of lines 412 is connected to the line 411. That is, the lines 412 are positioned pectinately.

The receiving antenna includes lines 420 to 422. One end of the line 420 is connected to the RFID reader 103. The line 421 extends in the Y-direction, and a center part thereof is connected to the other end of the line 420. The line 422 is formed to extend in the X-direction, and a plurality thereof are positioned side by side in the Y-direction. One end of each of the plurality of lines 422 is connected to the line 421. That is, the lines 412 are positioned pectinately.

The plurality of lines 412 in the transmitting antenna and the plurality of lines 422 in the receiving antenna are positioned in a nested manner. That is, the article management system 4 has a configuration in which a comb shape composed of the transmitting antenna and a comb shape composed of the receiving antenna face and interfit with one another.

The transmitting antenna and the receiving antenna in comb shapes positioned at mutually interfitting locations are used in the configuration. Accordingly, compared with the aforementioned exemplary embodiments, even with one each of the transmitting antenna and the receiving antenna, distances between the transmitting antenna and the receiving antenna, and a plurality of RFID tags two-dimensionally positioned in a plane, can be uniformed. Consequently, signal reception with high sensitivity from each of the plurality of RFID tags two-dimensionally positioned in a plane can be performed.

Fifth Exemplary Embodiment

Figure 12:
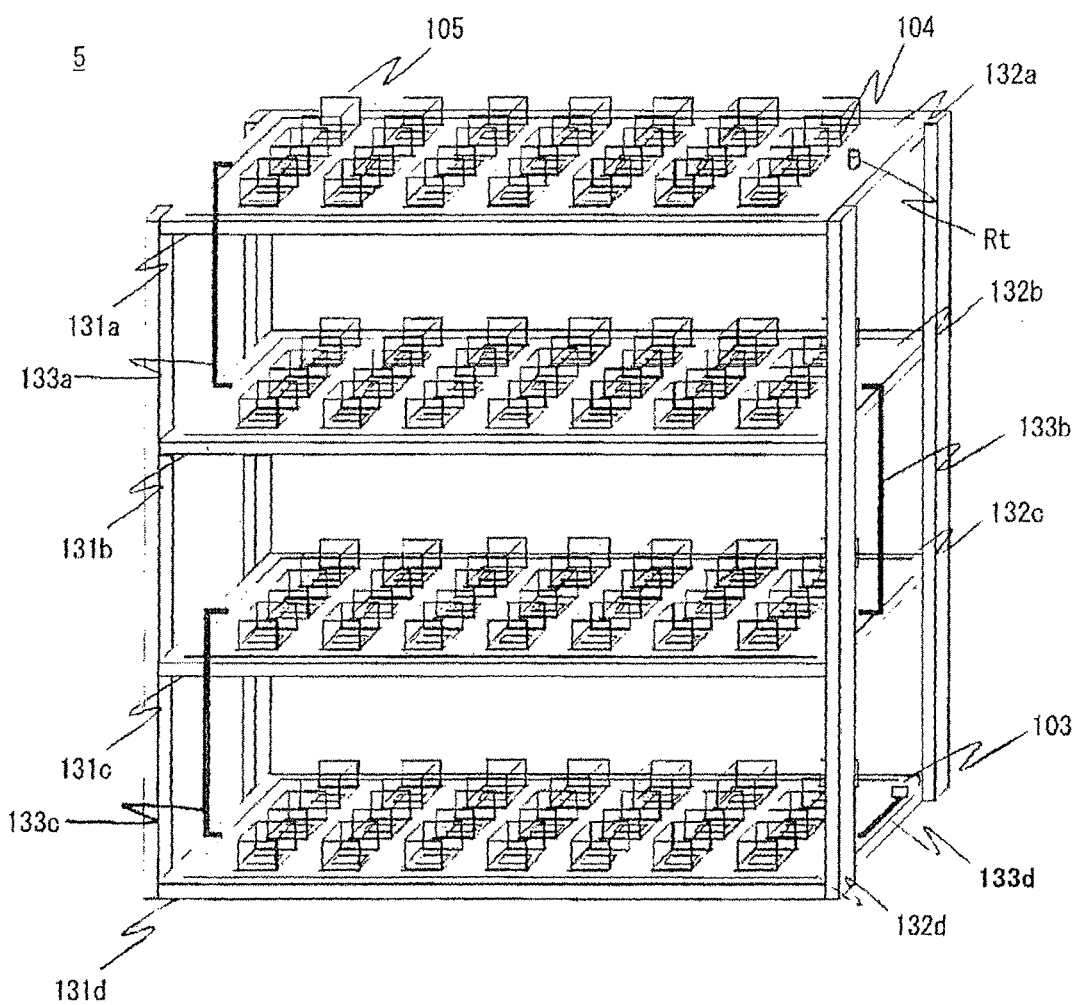
FIG. 12 is a diagram schematically illustrating an article management system according to a fifth exemplary embodiment.

A fifth exemplary embodiment providing reader antennas and RF tags on a plurality of shelves, and managing the plurality of RF tags provided on the plurality of shelves with one RFID reader, will be described. FIG. 12 illustrates a diagram schematically illustrating an article management system 5 according to the fifth exemplary embodiment. In the description of the fifth exemplary embodiment, a same reference sign in the first exemplary embodiment is given to a same component described in the first exemplary embodiment, thus omitting description thereof.

As illustrated in FIG. 12, articles to be managed 105 are arranged on a shelf composed of four tiers of shelf boards, shelf boards 131a to 131d, according to the fifth exemplary embodiment. Sheet reader antennas 132a to 132d, being connected in series to an RFID reader 103 by use of cables 133a to 133d, are installed on the front surface of each of the shelf boards 131a to 131d. A matched-termination resistor Rt is installed at the right end of the reader antenna 132a, out of the reader antennas 132a to 132d.

When a plurality of reader antennas are installed on the RFID reader 103, the antennas may be connected in series as illustrated in FIG. 12, or may be connected in parallel by use of a distributor, or serial connection and parallel connection may be combined. The serial connection enables use of an open-type transmission line in a traveling-wave antenna in use as part of the cable, and therefore a total cable length can be shortened. Further, excess signal attenuation can be avoided due to disuse of a distributor and the like.

On the other hand, the parallel connection is able to prevent non-uniformity in tag reading due to overlapping attenuation in the reader antenna and the cable. For example, a phenomenon such that, while it easy to read an RF tag 104 at the upper-right edge of the reader antenna 132d, it is difficult to read an RF tag 104 at the upper-right edge of the reader antenna 132a, due to a large amount of attenuation of a signal from the RFID reader 103 and a reflected signal generated by the RF tag 104, can be suppressed. Additionally, in the case of the parallel connection, by using an antenna switch instead of a distributor, and controlling the switch from the RFID reader 103, the plurality of reader antennas 132a to 132d may be used by time-division switching. At this time, an output of the RFID reader 103 can be set sufficiently low, by shortening an interval and strengthening coupling, between the RF tag 104 and the reader antenna. Alternatively, a radiation electric field from the reader antenna can be designed to be low. Thus, a distance for recognizing the RF tag 104 by the reader antenna can be shortened. That is, an RF tag 104 on the reader antenna 132b is not read by the adjacent reader antennas 132a or 132c, or the reader antenna 132d. By ensuring independent operation between the shelf boards, the number of RF tags 104 that can be handled may be increased to a multiple of the number of the reader antennas, by using a plurality of reader antennas in a time-division manner.

While the example according to the fifth exemplary embodiment that one reader antenna is positioned on one shelf board, has been described, the exemplary embodiment of the present invention is not limited thereto. For example, a plurality of reader antennas may be positioned on one shelf board. Further, a part connected by a cable may be formed as a continuous reader antenna by eliminating the cable, taking advantage of a property of an open-type transmission line in the reader antenna. That is, one reader antenna may be positioned on a plurality of shelf boards.

An operation of the article management system 5 according to the fifth exemplary embodiment will be described. In the article management system 5, each of the RF tags 104 positioned on the reader antennas 132a to 132d in FIG. 12, has unique tag information (ID). Further, tag information in an RF tag 104 is noted in advance. At that time, in a case that a location of an article to be managed 105 is needed, it is preferable to also note the location on a shelf, being associated with the tag information. The RFID reader 103 transmits a signal inquiring tag information to the reader antennas 132a to 132d. At this time, at a location at which a article to be managed 105 is not present, an RF tag 104 returns own tag information. On the other hand, when a article to be managed 105 is present, as described in the first exemplary embodiment, the RF tag 104 does not respond, or a strength of a reflected signal thereof becomes lower compared with a case that the article to be managed 105 is not present. The article management system 5 also determines presence or absence of a article to be managed 105 from the signal strength. At this time, by comparing a location associated with tag information with presence or absence information of an article to be managed 105, a location at which an article to be managed 105 is present and a location at which an article to be managed 105 is not present, can be detected. A threshold value of a signal strength in determination of presence or absence of a article to be managed 105 may be individually set to each RF tag 104, in accordance with tag information. Thus, difference in signal strength due to difference in individual tag position can be compensated for, and a threshold value for optimum presence or absence determination of an article to be managed 105 can be set individually. Additionally, a threshold value of a signal strength in determination of presence or absence of a article to be managed 105 may be determined by measuring a signal strength of an RF tag 104 in the absence of an article to be managed 105, and setting the signal strength decreased at a predetermined rate as the threshold value. Thus, the threshold value can be easily set.

While the particular example according to the fifth exemplary embodiment that a bottom surface of a shelf board is covered with RF tags 104, has been described, the present invention is not limited thereto. For example, when articles such as snacks, including a chocolate packaged in aluminum, and books are stacked flat, an RF tag 104 may be installed on a wall surface of a shelf. At that time, positioning of a reader antenna shall also be changed. Further, a case that an RF tag 104 is installed on a top board of a shelf may be considered. For example, in a refrigeration case at a convenience store, a shelf board with rollers by which a next drink is automatically pushed out toward the front when a customer takes out a drink, is commonly used. In such a case, it may be considered to arrange RF tags 104 on the top shelf board to detect drinks arranged below.

An article to be managed 105, presence or absence thereof being detectable, includes an article containing metal material such as a snack, a cigarette, a chocolate, and gum, packaged in aluminum. Further, an article containing water being material with a high dielectric constant is also detectable, and a drink, a rice ball, bread, a prepared food, a boxed meal, and the like are detectable. Furthermore, experimentally, a thick bundle of paper such as a book is also detectable. Further, a human body is also detectable, and therefore, for example, a flow line of walkers can be detected, by incorporating the system into a floor. Further, information such as whether a person is lying, seated, or standing in a toilet can be detected without invading privacy. Alternatively, when the system is installed on a wall surface, a contact by a human can be detected, and a movable touch button may be provided by moving an RF tag 104 on a reader antenna.

Other Exemplary Embodiments

The present invention is not limited to the aforementioned exemplary embodiments, and may be altered as appropriate without departing from the spirit thereof. For example, while the present exemplary embodiment particularly describes article management on a shelf, the scope of the article management system according to the present invention is not limited to a shelf. It is needless to say that, for example, the article management system according to the present invention may be positioned on a pallet or a floor, and manage an article mounted on the pallet or the floor.

Further, while it is assumed in the present invention that an RF tag 104 incorporating a semiconductor chip is used, a chipless RF tag, being developed recently, may also be used. A chipless RF tag is a tag including, for example, a plurality of resonators having different resonance frequencies, respectively, and an ID number of a few bits can be read wirelessly, by a reader detecting the combination of the resonance frequencies. Such a chipless RF tag also provides a situation that the ID can be read when an article to be managed 105 is not present, and cannot be read when an article is present, and therefore the present invention may be applied.

The article management systems 3 to 5 according to the third to fifth exemplary embodiments may have a configuration including a circulator 106 being inserted between a transmitting antenna 102a and a receiving antenna 102b, and an RFID reader 103, similarly to the article management system 2 according to the second exemplary embodiment.

As described above, the present invention is able to provide an article management system suppressing erroneous detection due to occurrence of a multipath phenomenon and an incident such that a person or a thing comes between a line and a location at which an article is positioned, without affixing an RF tag to an article to be managed, without positioning of the article to be managed being limited between a reader and a tag, and without requiring a large space between the RFID reader and the RF tag.

While the present invention has been described above with reference to the exemplary embodiments, the present invention is not limited to the aforementioned exemplary embodiments. Various changes and modifications that can be understood by a person skilled in the art may be made to the configurations and details of the present invention, within the scope of the present invention.

This application claims priority based on Japanese Patent Application No. 2014-044835 filed on Mar. 7, 2014, the disclosure of which is hereby incorporated by reference thereto in its entirety.

REFERENCE SIGNS LIST 1 to 5 Article management system
101 Dielectric layer
102a, 410 Transmitting antenna
102b, 420 Receiving antenna
102 Strip conductor
102ag Grounding conductor
102g Grounding conductor
103 RFID reader
104 RF tag
105 Article to be managed
106 Shield plate
110 Management-target article positioning region
111 RFID chip
112 Tag antenna (tag transmission unit)
131a to 131d Shelf board
132a to 132d, 301 to 305 Reader antenna
133a to 133d Cable
311 Switching circuit
321 to 325, Rt Matched-termination resistor
410 to 412, 420 to 422 Line
CON Control signal
REF Reflected wave
Sr Response signal
St Transmission signal

The invention claimed is:

1. An article management system comprising:
   a transmitting antenna that include an open-type transmission line with matched termination and transmits a radio signal;
   a receiving antenna that includes an open-type transmission line, and receives a radio signal;
   a management-target article positioning region in which an article to be managed is placed;
   an RF tag provided with tag transmission unit that electromagnetically couples with the transmitting antenna and the receiving antenna in the article to be managed positioning region; and
   an RFID reader that transmits a transmission signal to the RF tag through the transmitting antenna and receives a response signal output by the tag transmission unit through the receiving antenna, wherein
   the RFID reader detects presence or absence of the article to be managed, by detecting a change in an operation characteristic of the tag transmission unit caused by the article to be managed, by use of a change in strength or phase of the response signal from the RF tag, and
   a coupling coefficient k1 between the transmitting antenna and the receiving antenna, and the tag transmission unit has a value satisfying $10^{-5} \leq k1 \leq 10^{-2}$.

2. The article management system according to claim 1, wherein,
   the management-target article positioning region is set at a location satisfying a relation of $L1 \leq \lambda$, where $\lambda$ is a wavelength of a signal used for communication by the RFID reader and the RF tag, and L1 is a first distance between the article to be managed and the tag transmission unit, and
   the RF tag is installed at a location satisfying a relation of $L2 < \lambda$, where L2 is a second distance that is a line-of-sight distance from the tag transmission unit to the transmitting antenna and the receiving antenna.

3. The article management system according to claim 2, wherein, when a circular constant is denoted by $\pi$, the first distance satisfies a relation of $L1 > \lambda/2\pi$.

4. The article management system according to claim 2 wherein, when a circular constant is denoted by $\pi$, the second distance satisfies a relation of $L2 > \lambda/2\pi$.

5. The article management system according to claim 2, wherein the first distance and the second distance satisfy a relation of $L2 > L1$.

6. The article management system according to claim 1, wherein a coupling coefficient k1 between the transmitting antenna and the receiving antenna, and the tag transmission unit is less than a coupling coefficient k2 between the article to be managed and the tag transmission unit.

7. The article management system according to claim 1, further comprising a dielectric layer on which the transmitting antenna and the receiving antenna are arranged on sides of the RF tag, the RF tag being disposed on a surface side of the dielectric layer, the management-target article positioning region being set at a location above the RF tag.

8. The article management system according to claim 1, further comprising a circulator inserted between the RFID reader and the transmitting antenna and the receiving antenna, the circulator transferring a transmission signal from the RFID reader to the transmitting antenna, and transferring a response signal from the receiving antenna to the RFID reader.

9. The article management system according to claim 1, wherein the transmitting antenna includes a plurality of lines extending in a first direction, the receiving antenna includes a plurality of lines extending in the first direction, and the plurality of lines in the transmitting antenna and the plurality of lines in the receiving antenna are interposed in a second direction, the second direction being different from the first direction.

10. The article management system according to claim 1, further comprising:
   a plurality of reader antennas; and
   a switching circuit that connects one or more of the plurality of reader antennas to the RFID reader to form the transmitting antenna, and connects one or more of the plurality of reader antennas, other than the one or more of the plurality of reader antennas forming the transmitting antenna to the RFID reader to form the receiving antenna.

* * * * *